(12) United States Patent
Kim et al.

(10) Patent No.: US 11,901,610 B2
(45) Date of Patent: Feb. 13, 2024

(54) ELECTRONIC APPARATUS INCLUDING ANTENNA MODULE

(71) Applicant: SAMSUNG ELECTRONICS CO., LTD., Suwon-si (KR)

(72) Inventors: Jaehyung Kim, Suwon-si (KR); Jinkyu Bang, Suwon-si (KR); Jaebong Chun, Suwon-si (KR); Hanbin Lee, Suwon-si (KR); Sangmin Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/272,164

(22) PCT Filed: Aug. 30, 2019

(86) PCT No.: PCT/KR2019/011114
§ 371 (c)(1),
(2) Date: Feb. 26, 2021

(87) PCT Pub. No.: WO2020/046032
PCT Pub. Date: Mar. 5, 2020

(65) Prior Publication Data
US 2021/0328329 A1    Oct. 21, 2021

(30) Foreign Application Priority Data

Aug. 30, 2018 (KR) .................. 10-2018-0102800

(51) Int. Cl.
*H01Q 1/24* (2006.01)
*H01Q 3/34* (2006.01)
(Continued)

(52) U.S. Cl.
CPC .............. *H01Q 1/243* (2013.01); *H01Q 3/34* (2013.01); *H01Q 9/0407* (2013.01);
(Continued)

(58) Field of Classification Search
CPC ........ H01Q 1/243; H01Q 3/34; H01Q 9/0407; H01Q 21/065; H01Q 9/285; H01Q 21/28;
(Continued)

(56) References Cited

U.S. PATENT DOCUMENTS 6,806,835 B2 * 10/2004 Iwai ................ H01Q 21/29
343/702
7,031,744 B2   4/2006 Kuriyama et al.
(Continued)

FOREIGN PATENT DOCUMENTS

JP   2002-171190   6/2002
JP   2004-282216   10/2004
(Continued)

OTHER PUBLICATIONS

International Search Report for PCT/KR2019/011114 dated Jan. 31, 2020, 6 pages.
(Continued)

*Primary Examiner* — Hai V Tran
*Assistant Examiner* — Bamidele A Immanuel
(74) *Attorney, Agent, or Firm* — Nixon & Vanderhye, P.C.

(57) ABSTRACT

Disclosed is an electronic apparatus comprising: a housing; a display; first antenna structure comprising a first array of antenna elements; second antenna structure comprising a second array of antenna elements; and at least one wireless communication circuit which is electrically connected to the first array and the second array, and transmits and/or receives signals having a frequency between 3 GHz and 100 GHz.

7 Claims, 16 Drawing Sheets

(51) Int. Cl.
*H01Q 9/04* (2006.01)
*H01Q 21/06* (2006.01)
*H04M 1/02* (2006.01)

(52) U.S. Cl.
CPC ........ *H01Q 21/065* (2013.01); *H04M 1/0218* (2013.01); *H04M 1/0268* (2013.01)

(58) Field of Classification Search
CPC ............. H04M 1/0218; H04M 1/0247; H04M 1/0268; H04M 1/0214; H04M 1/026; H04M 1/0249; H04M 1/0277; H04B 1/40
See application file for complete search history.

(56) References Cited

U.S. PATENT DOCUMENTS

| | | | | |
|---|---|---|---|---|
| 7,840,243 | B2 * | 11/2010 | Hirai | H01Q 1/244 455/575.1 |
| 8,725,213 | B2 | 5/2014 | Nakamura | |
| 9,236,649 | B2 | 1/2016 | Jarvis et al. | |
| 9,905,922 | B2 * | 2/2018 | Lee | H01Q 1/243 |
| 9,935,361 | B2 * | 4/2018 | Chang | H01Q 1/243 |
| 10,103,423 | B2 | 10/2018 | Jarvis et al. | |
| 10,879,589 | B2 | 12/2020 | Lim et al. | |
| 2002/0068602 | A1 * | 6/2002 | Kuriyama | H04B 7/0805 343/702 |
| 2003/0022637 | A1 * | 1/2003 | Hirota | G06F 1/1616 455/272 |
| 2003/0228891 | A1 * | 12/2003 | Kobayashi | H04W 52/42 455/575.1 |
| 2004/0041734 | A1 * | 3/2004 | Shiotsu | H01Q 9/42 343/702 |
| 2005/0093753 | A1 * | 5/2005 | Masaki | H01Q 1/2266 343/702 |
| 2005/0143151 | A1 * | 6/2005 | Ito | H04B 7/0871 455/575.5 |
| 2005/0146470 | A1 * | 7/2005 | Li | G06F 1/1698 343/702 |
| 2008/0081657 | A1 * | 4/2008 | Suzuki | H01Q 1/243 343/702 |
| 2009/0325528 | A1 * | 12/2009 | Yokota | H04B 7/0805 455/277.1 |
| 2011/0234617 | A1 * | 9/2011 | Watanabe | G09G 3/20 345/589 |
| 2012/0196651 | A1 * | 8/2012 | Nakamura | H04B 7/0834 455/566 |
| 2013/0050056 | A1 * | 2/2013 | Lee | H01Q 3/30 343/893 |
| 2014/0145879 | A1 * | 5/2014 | Pan | H01Q 21/24 29/601 |
| 2015/0070219 | A1 | 3/2015 | Dinh et al. | |
| 2017/0110786 | A1 * | 4/2017 | Liu | H01Q 1/2266 |
| 2017/0356980 | A1 * | 12/2017 | Islam | H01Q 3/24 |
| 2018/0219587 | A1 * | 8/2018 | Huo | H04B 1/40 |
| 2018/0277936 | A1 | 9/2018 | Dinh et al. | |
| 2018/0316379 | A1 * | 11/2018 | Chang | H01Q 1/245 |
| 2018/0366813 | A1 * | 12/2018 | Kim | H04M 1/0266 |
| 2020/0194904 | A1 * | 6/2020 | Huh | H04M 1/0243 |
| 2020/0304185 | A1 * | 9/2020 | Tsai | H04B 7/0802 |
| 2021/0091456 | A1 | 3/2021 | Lim et al. | |
| 2022/0255216 | A1 * | 8/2022 | Zhao | H01Q 3/06 |
| 2022/0345559 | A1 * | 10/2022 | Heo | H01Q 21/065 |
| 2023/0269893 | A1 * | 8/2023 | Yun | G06F 1/1681 361/807 |

FOREIGN PATENT DOCUMENTS

| | | |
|---|---|---|
| JP | 2015-114718 | 6/2015 |
| JP | 5894138 | 3/2016 |
| KR | 10-2010-0045824 | 5/2010 |
| KR | 10-2014-0053396 | 5/2014 |
| KR | 10-2017-0066944 | 6/2017 |
| KR | 2017-0120985 | 11/2017 |
| WO | 2018/093358 | 5/2018 |

OTHER PUBLICATIONS

Written Opinion of the ISA for PCT/KR2019/011114 dated Jan. 31, 2020, 5 pages.

Office Action dated Jul. 17, 2022 in KR Application No. 10-2018-0102800 and English-language translation.

Office Action dated Jan. 30, 2023 in Korean Patent Application No. 10-2018-0102800 and English-language translation.

* cited by examiner

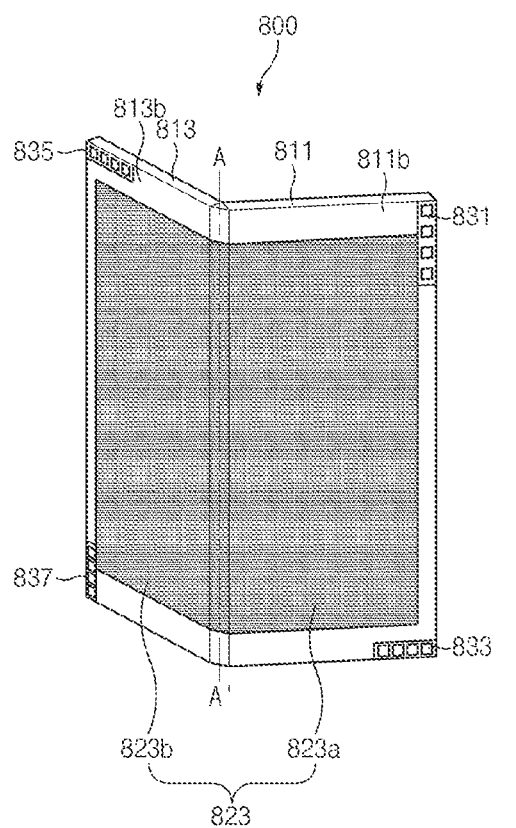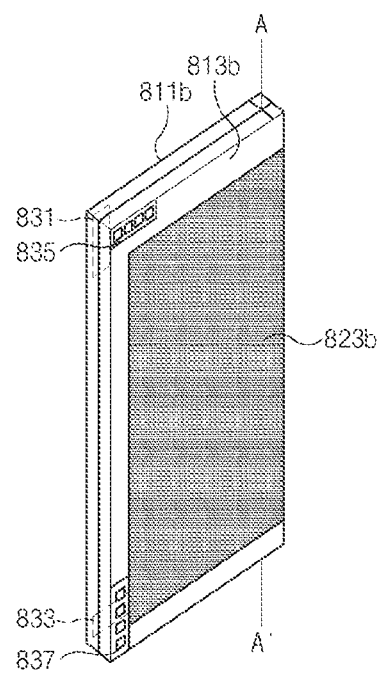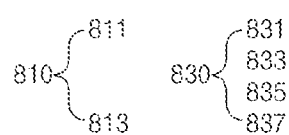
FIG.8A  FIG.8B

ELECTRONIC APPARATUS INCLUDING ANTENNA MODULE

This application is the U.S. national phase of International Application No. PCT/KR2019/011114 filed Aug. 30, 2019 which designated the U.S. and claims priority to KR Patent Application No. 10-2018-0102800 filed Aug. 30, 2018, the entire contents of each of which are hereby incorporated by reference.

Embodiments of the present disclosure relate to an electronic device including an antenna module.

DESCRIPTION OF RELATED ART

With the development of information technology (IT), various types of electronic devices such as smartphones and tablet personal computers (PCs) are widely disseminated. Furthermore, since electronic devices have a folding structure using a plurality of displays or a flexible display, users may fold or unfold the electronic devices to use the electronic devices according to situations. Electronic devices may wirelessly communicate with other electronic devices or base stations using an antenna module.

Recently, the necessity of transmitting or receiving data such as a high-definition image, high-quality sound, or high-definition video in compliance with various types of electronic devices has increased. To this end, 5th generation (5G) mobile communication technology using high-frequency band signals is developed. If high-frequency band signals are used, the wavelengths of signals may decrease to a millimeter level and a wider bandwidth may be used, and thus a larger amount of data may be transmitted or received.

SUMMARY

Electronic devices may have a limited space for arranging a plurality of antenna modules for smoothly transmitting/receiving signals. Furthermore, in the case of foldable electronic devices having a folding structure, the relative positions of antenna modules installed in the electronic devices may change according to an unfolded or open state or a folded state of the electronic devices. Therefore, if the electronic devices are changed from the unfolded state to the folded state, the directions in which beams of the plurality of antenna modules are formed may change, thus causing interference. For example, this interference may be more fatal to an antenna module for a signal having a frequency between 3 GHz and 100 GHz, the antenna module forming a beam for transmitting/receiving a signal in a specified direction.

An electronic device according to various embodiments of the present invention may provide a smooth communication environment by arranging a plurality of antenna modules so that beams that are formed in specified directions to transmit/receive a signal having a frequency between 3 GHz and 100 GHz do not cause interference not only in the unfolded state but also in the folded state.

An electronic device according to an embodiment of the present disclosure may include: a housing including a first housing structure which includes a first plate and a second plate oriented in an opposite direction to the first plate and a second housing structure which is bendable over the first housing structure with respect to an axis, and includes a third plate and a fourth plate oriented in an opposite direction to the third plate, wherein the third plate faces the first plate or the fourth plate faces the second plate in a folded state of the housing; a display including a first part located in the first housing structure and viewable through the first plate and a second part located in the second housing structure and viewable through the third plate; a first antenna structure including a first array of antenna elements closer to one of the first plate and the second plate than to the other of the first plate and the second plate and located in the first housing structure; a second antenna structure including a second array of antenna elements closer to one of the third plate and the fourth plate than to the other of the third plate and the fourth plate and located in the second housing structure; and at least one wireless communication circuit electrically connected to the first array and the second array and configured to transmit and/or receive a signal having a frequency between 3 GHz and 100 GHz.

Furthermore, an electronic device according to an embodiment of the present disclosure may include: a housing including a first housing structure which includes a first plate and a second plate oriented in an opposite direction to the first plate and a second housing structure which is bendable over the first housing structure with respect to an axis, and includes a third plate and a fourth plate oriented in an opposite direction to the third plate, wherein the third plate faces the first plate or the fourth plate faces the second plate in a folded state; a display including a first part located in the first housing structure and viewable through the first plate and a second part located in the second housing structure and viewable through the third plate; a first antenna structure located in the first housing structure and including a first array of antenna elements closer to the first plate than to the second plate; a second antenna structure located in the first housing structure and including a second array of antenna elements closer to the second plate than to the first plate; a third antenna structure located in the second housing structure and including a third array of antenna elements closer to the third plate than to the fourth plate; a fourth antenna structure located in the second housing structure and including a fourth array of antenna elements closer to the fourth plate than to the third plate; and at least one wireless communication circuit electrically connected to the first array and the second array and configured to transmit and/or receive a signal having a frequency between 3 GHz and 100 GHz.

According to embodiments of the present disclosure, an electronic device may smoothly transmit/receive signals since a plurality of antenna modules are arranged so that beams that are formed by antenna elements in specified directions to transmit/receive a signal having a frequency between 3 GHz and 100 GHz cause less interference in the open state and folded state.

Besides, various effects may be provided that are directly or indirectly identified through the present disclosure.

BRIEF DESCRIPTION OF THE DRAWINGS

FIGS. 8A and 8B are diagrams illustrating arrangement of antenna modules in an electronic device according to an embodiment.

With respect to the description of the drawings, the same or similar reference signs may be used for the same or similar elements.

DETAILED DESCRIPTION

Hereinafter, various embodiments of the present invention will be described in detail with reference to the accompanying drawings. However, it should be understood that the present invention is not limited to specific embodiments, but rather includes various modifications, equivalents and/or alternatives of various embodiments of the present invention.

Figure 1:
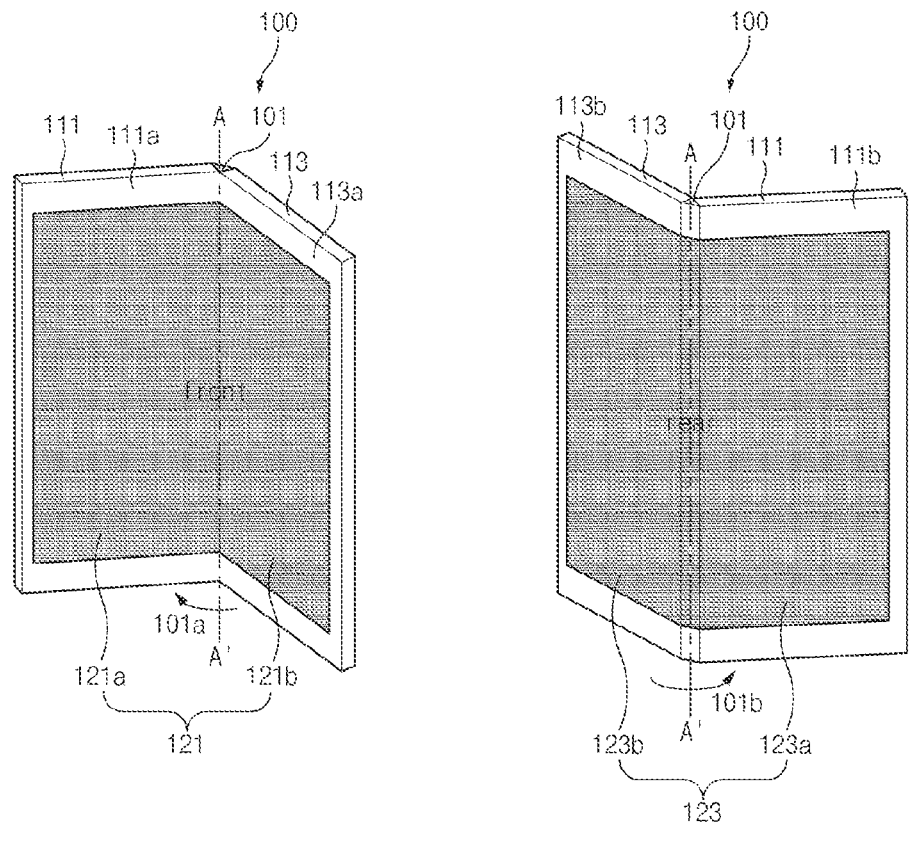
FIG. 1 is a diagram illustrating an electronic device according to various embodiments.

FIG. 1 is a diagram illustrating an electronic device according to various embodiments.

Referring to FIG. 1, an electronic device 100 may be a foldable electronic device having a folding structure. The folding structure may indicate that two parts of the electronic device 100 are parallel to each other with respect to a specified line.

According to an embodiment, the electronic device 100 may include a housing 110 in which components (e.g., a display 120, etc.) may be arranged. According to an embodiment, the housing 110 may include a first housing (or first housing structure) 111 and a second housing (or second housing structure) 113. According to an embodiment, at least one of a front side or rear side of the housing 110 may include a display 120.

According to an embodiment, the first housing 111 may include a first plate 111a and a second plate 111b. A side surface of the first housing 111 may extend from the first plate 111a and the second plate 111b. According to an embodiment, the second housing 113 may include a third plate 113a and a fourth plate 113b. A side surface of the second housing 113 may extend from the third plate 113a and the fourth plate 113b.

According to an embodiment, the first plate 111a and the third plate 113a may form the front side of the electronic device 100, and the second plate 111b and the fourth plate 113b may form the rear side of the electronic device 100. Furthermore, the side surface of the first housing 111 and the side surface of the second housing 113 may form a side surface of the housing 110. According to an embodiment, the first housing 111 and the second housing 113 may be connected (or coupled) via a connection member 101.

According to an embodiment, the housing 110 of the electronic device 100 may form a folding structure. For example, the second housing 113 may be bent over the first housing 111 with respect to an axis A-A'. The second housing 113, for example, may be bent in a first direction 101a and/or second direction 101b towards the first housing 111 with respect to the axis A-A'. According to an embodiment, the housing 110 of the electronic device 100 may be folded with the connection member 101 as the axis A-A'.

According to an embodiment, the electronic device 100 may include at least one display 120 capable of displaying a content image. The display 120, for example, may be exposed (or viewable) through at least one of the front side or rear side of the electronic device 100. According to an embodiment, the display 120 may include at least one of a first display 121 exposed through the front side and/or a second display 123 exposed through the rear side. According to an embodiment, the first display 121 may include a first part 121a located in the first housing 111 and a second part 121b located in the second housing 113. The first part 121a, for example, may be exposed through at least a part of the first plate 111a of the first housing 111, and the second part 121b may be exposed through at least a part of the third plate 113a of the second housing 113. According to an embodiment, the second display 123 may include a third part 123a located in the first housing 111 and a fourth part 123b located in the second housing 113. The third part 123a, for example, may be exposed through the second plate 111b of the first housing 111, and the fourth part 123b may be exposed through the fourth plate 113b of the second housing 113.

According to an embodiment, the first display 121 and/or the second display 123 may be a flexible display. The flexible display may be bent with respect to a specified line so as to be installed in the housing 110 having a folding structure. The specified line may be, for example, the folding axis A-A' of the electronic device 100. According to another embodiment, the first display 121 and/or the second display 123 may include a plurality of physically separated displays. The plurality of displays may be arranged in each of the first housing 111 and the second housing 113 so as to be installed in the housing 110 having a folding structure.

According to an embodiment, in the case where the display 120 only includes the first display 121 exposed through the front side of the housing 110, a part of the rear side of the housing 110, through which the second display 123 is exposed, may include a conductive housing. According to another embodiment, in the case where the display 120 only includes the second display 123 exposed through the rear side of the housing 110, a part of the front side of the housing 110, through which the first display 121 is exposed, may include a conductive housing.

According to an embodiment, the electronic device 100 may be used in an open state or folded state. According to an embodiment, the electronic device 100 may output content according to the open state or folded state. For example, the electronic device 100 may switch the display 120 for outputting content according to the open state or folded state.

According to an embodiment, the electronic device may be implemented as various types of electronic devices capable of outputting content through a display, such as a smartphone, tablet PC, laptop computer, wearable device, or electronic book.

FIG. 2 is a diagram illustrating an open state and folded state of an electronic device according to various embodiments.

Referring to FIG. 2, the electronic device 100 may be changed from the open state to the folded state by being folded with respect to a specified axis (e.g., the axis A-A' of FIG. 1). Although the electronic device 100 may be folded in two directions (e.g., the first direction 101a and the second direction 101b of FIG. 1), the following descriptions are provided on the assumption that the electronic device 100 is folded in one direction (e.g., the first direction 101a). The following descriptions may also be applied to the case where the electronic device 100 is folded in another direction (e.g., the second direction 101b).

Figure 2A:
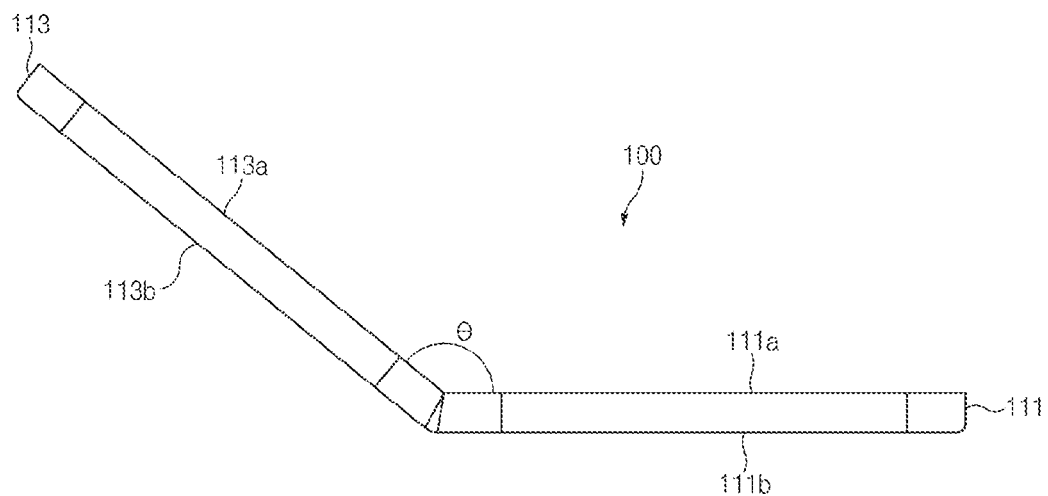
FIGS. 2A and 2B are diagrams illustrating an unfolded state and folded state of an electronic device according to various embodiments.

Referring to FIG. 2A, the electronic device 100 may be in the open state. The open state may be, for example, a state in which the first plate 111a of the first housing 111 and the third plate 113a of the second housing 113 do not face each other. For another example, the open state may be a state in which the second plate 111b of the first housing 111 and the fourth plate 113b of the second housing 113 do not face each other. According to an embodiment, the open state may be defined as an angle θ between the first plate 111a and the third plate 113a. For example, the open state may be a state in which the angle θ between the first housing 111 and the second housing 113 is at least a specified angle (e.g., 90°).

According to an embodiment, the first display 121 and/or the second display 123 may output content in the open state. A user may view content output by the first display 121 and/or the second display 123. Therefore, the electronic device 100 may output content through at least one of the first display 121 or the second display 123 in the open state.

Figure 2B:
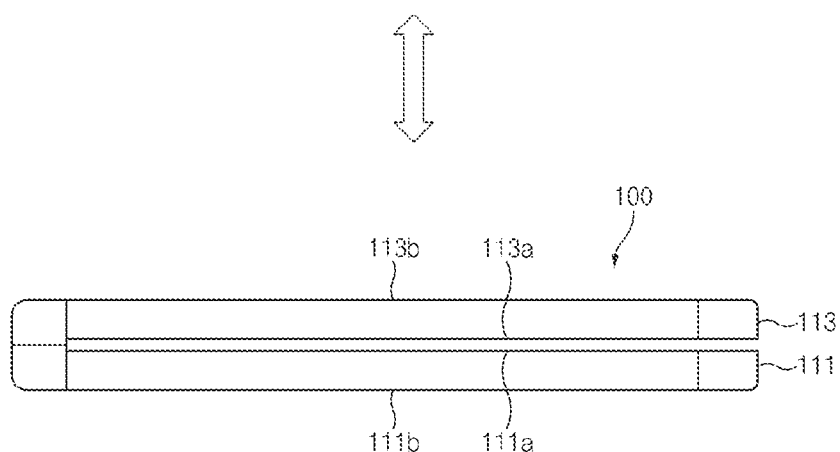

Referring to FIG. 2B, the electronic device 100 may be in the folded state. The folded state may be, for example, a state in which the first plate 111a of the first housing 111 and the third plate 113a of the second housing 113 face each other. For example, the first plate 111a and the third plate 113a may be completely parallel or nearly parallel to each other. For another example, the folded state may be a state in which the second plate 111b of the first housing 111 and the fourth plate 113b of the second housing 113 oppose each other.

According to an embodiment, only the second display 123 may output content to the outside of the electronic device 100 in the folded state. The user may view only content output by the second display 123. Therefore, the electronic device 100 may output content only through the second display 123.

Figure 3:
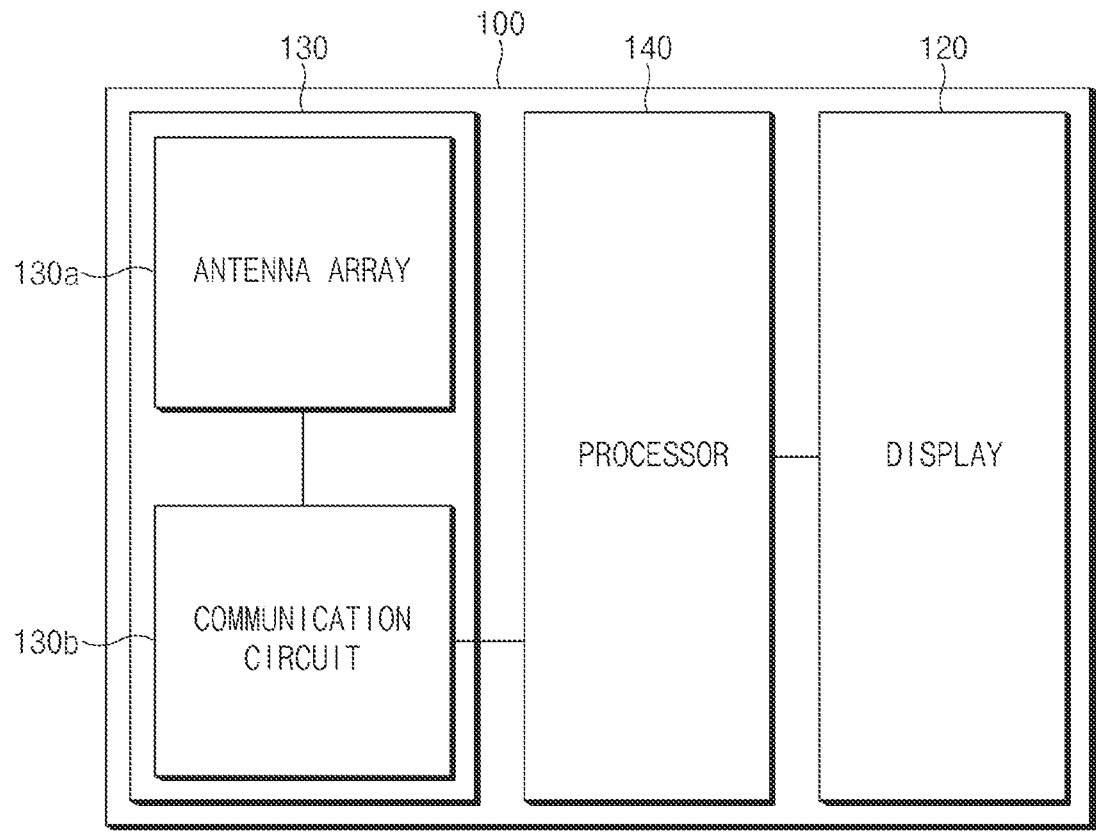
FIG. 3 is a block diagram illustrating a configuration of the electronic device 100 according to various embodiments.

FIG. 3 is a block diagram illustrating a configuration of the electronic device 100 according to various embodiments.

Referring to FIG. 3, the electronic device 100 may include a display 120, an antenna module 130, and/or a processor 140.

According to an embodiment, the display 120 may display an image of content. For example, the display 120 may display an image of content stored in the electronic device 100 or may display an image of content received from an external electronic device 100.

According to an embodiment, the display 120 may be a display which is installed in a foldable electronic device. For example, the display 120 may be installed in two surfaces (e.g., the first plate 111a and the third plate 113a of FIG. 2) facing each other or two surfaces (e.g., the second plate 111b and the fourth plate 113b of FIG. 2) opposing each other in the folded state of the electronic device 100. According to an embodiment, the display 120 may include a flexible display which is folded with respect to a specified line. According to another embodiment, the display 120 may include a plurality of physically separated displays.

According to an embodiment, the antenna module 130 may include an antenna array 130a and/or a communication circuit 130b. According to an embodiment, the antenna module 130 may be an antenna module for 5th generation (5G) communication. The antenna module may transmit/receive a signal in a specified direction. The antenna module may form a beam (or beam pattern) in the specified direction in order to transmit/receive a signal in the specified direction.

According to an embodiment, the antenna array 130a may include a plurality of antenna elements. The plurality of antenna elements may form at least one beam in order to communicate with an external electronic device. According to an embodiment, the plurality of antenna elements may include a plurality of patch antenna elements and/or a plurality of dipole antenna elements in order to form a beam in a specified direction.

According to an embodiment, the communication circuit 130b may be electrically connected to the antenna array 130a and may feed the antenna array 130a in order to transmit/receive a signal. For example, the communication circuit 130b may feed a current having a specified magnitude to the plurality of antenna elements included in the antenna array 130a.

According to an embodiment, the processor 140 may be electrically connected to the display 120 and the antenna module 130, and may control overall operation of the electronic device 100.

According to an embodiment, the processor 140 may display an image of content by controlling the display 120. According to an embodiment, the processor 140 may control the display 120 according to a state of the electronic device 140. For example, when the electronic device 100 is in the open state, the processor 140 may display an image on both of the first display 121 and the second display 123. Furthermore, when the electronic device 100 is in the folded state, the processor 140 may display an image on the second display 123 without operating the first display 121. According to an embodiment, the processor 140 may detect the state of the electronic device 100, and may display an image on the display 120 according to the detected state.

According to an embodiment, the processor 140 may communicate with an external electronic device by controlling the antenna module 130. For example, the processor 140 may form a beam in a specified direction by controlling the communication circuit 130b to feed the antenna array 130a. According to an embodiment, the processor 140 may receive or transmit a signal from or to an external electronic device through the formed beam.

According to an embodiment, the electronic device 100 may include a plurality of antenna modules 130 in order to smoothly transmit/receive a signal. The plurality of antenna modules 130 may smoothly transmit/receive a signal by forming beams in a plurality of directions. According to an embodiment, the plurality of antenna modules 130 may be arranged so that the formed beams do not interfere with each other. For example, the plurality of antenna modules 130 may be arranged so as to form beams in different directions.

According to an embodiment, the electronic device 100 may have a limited space for arranging a plurality of antenna modules for smoothly transmitting/receiving signals. For another example, in the case where the electronic device 100 is a foldable electronic device having a folding structure, relative positions of the antenna modules 130 installed in the electronic device 100 may change according to the open state or folded state. Therefore, if the electronic device 100 is changed from the open state to the folded state, the directions in which beams of the plurality of antenna modules 130 are formed may change, thus causing interference. For example, this interference may be more fatal to an antenna module which forms a beam for transmitting/receiving a signal in a specified direction. The electronic device 100 according to various embodiments of the present invention may provide a smooth communication environment since the plurality of antenna modules 130 are appropriately arranged so that formed beams do not interfere with each other not only in the open state but also in the folded state.

Figure 4A:
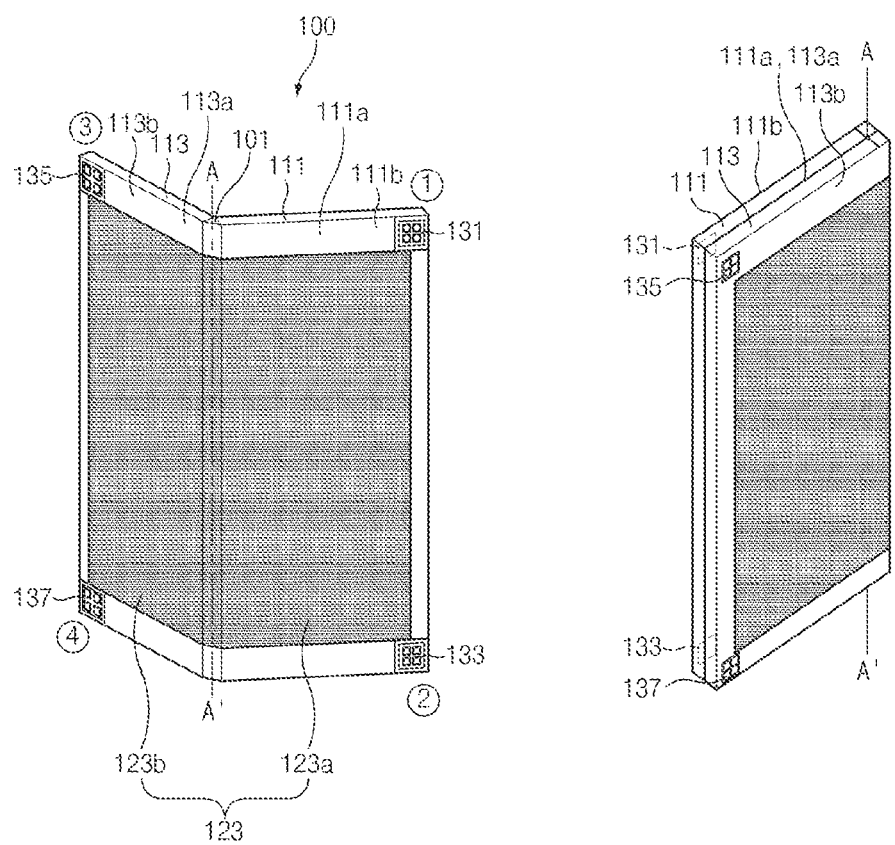
FIGS. 4A and 4B are diagrams illustrating arrangement of antenna modules in an electronic device according to an embodiment.
Figure 4B:
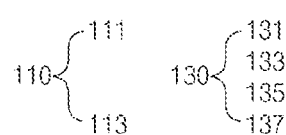

FIG. 4 is a diagram illustrating arrangement of antenna modules in an electronic device according to an embodiment.

Referring to FIG. 4, the plurality of antenna modules 130 of the electronic device 100 may be arranged so that formed beams do not interfere with each other.

According to an embodiment, the electronic device 100 may include the plurality of antenna modules 130. The plurality of antenna modules 130 may include a first antenna module 131, a second antenna module 133, a third antenna module 135, and/or a fourth antenna module 137. According to an embodiment, the plurality of antenna modules 130 may be located in the housing 110. For example, the first antenna module 131 and/or the second antenna module 133 may be arranged in the first housing 111. The third antenna module 135 and/or the fourth antenna module 137 may be located in the second housing 113.

According to an embodiment, the plurality of antenna modules 130 may have substantially the same structure. For example, each of the plurality of antenna modules 130 may include a plurality of patch antenna elements and/or a plurality of dipole antenna elements. The plurality of patch antenna elements and/or the plurality of dipole antenna elements may form beams in various directions. Structures of the plurality of antenna modules 130 and beams formed by the plurality of antenna modules 130 will be described in detail with reference to FIGS. 5 and 6.

According to an embodiment, the plurality of antenna modules 130 may be arranged so that formed beams do not interfere with each other in the open state of FIG. 2A. For example, the plurality of antenna modules 130 may be arranged in each corner of the electronic device 100 (or the housing 110) so as not to interfere with each other. The first antenna module 131 and the second antenna module 133 may be respectively arranged in a first corner ① and a second corner ② of the first housing 111. The third antenna module 135 and the fourth antenna module 137 may be respectively arranged in a third corner ③ and a fourth corner ④ of the second housing 113. For example, the first corner ①, the second corner ②, the third corner ③, and the fourth corner ④ may be apart from the axis A-A'.

According to an embodiment, the plurality of antenna modules 130 may be arranged so that formed beams do not interfere with each other in the folded state of FIG. 2B. In the case where the plurality of antenna modules 130 are arranged in the corners of the housing 110, the first antenna module 131 and the second antenna module 133 may be respectively adjacent to the third antenna module 135 and the fourth antenna module 137 in the folded state of FIG. 2B. For example, when viewed above the second plate 111b, the first antenna module 131 may at least partially overlap the third antenna module 135, and the second antenna module 133 may at least partially overlap the fourth antenna module 137. Therefore, the plurality of antenna modules 130 present in similar locations may be arranged so as to form beams in different directions in order to minimize interference. For example, the first antenna module 131 and/or the second antenna module 133 may be arranged so that patch antenna elements form beams in a direction of the second plate 111b. The third antenna module 135 and/or the fourth antenna module 137 may be arranged so that patch antenna elements form beams in a direction of the fourth plate 113b.

Figure 5A:
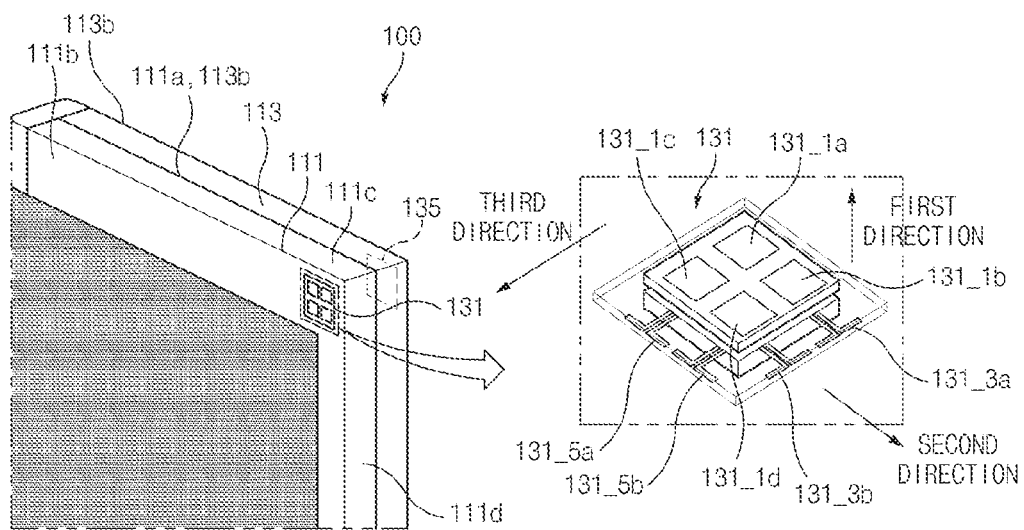
FIGS. 5A and 5B are diagrams illustrating antenna modules of an electronic device according to an embodiment.
Figure 5B:
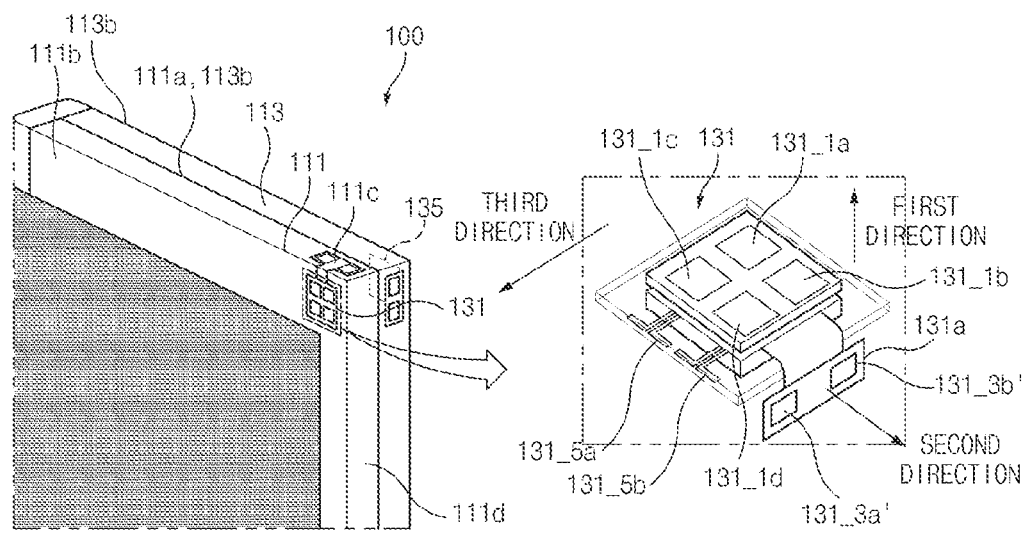

FIGS. 5A and 5B are diagrams illustrating antenna modules of an electronic device according to an embodiment.

Referring to FIG. 5A, the first antenna module 131 included in the electronic device 100 may include a plurality of patch antenna elements and/or a plurality of dipole antenna elements. A second antenna module (e.g., the second antenna module 133 of FIG. 4), the third antenna module 135, and a fourth antenna module (e.g., the fourth antenna module 137 of FIG. 4) may have substantially the same structure as the first antenna module 131.

According to an embodiment, the first antenna module 131 may be arranged in a corner (e.g., the first corner ①) of FIG. 4) of the first housing 111. According to an embodiment, the first antenna module 131 may include a first antenna array 131_1, a second antenna array 131_3, and/or a third antenna array 131_5.

According to an embodiment, the first antenna array 131_1 may include a plurality of patch antenna elements 131_1a, 131_1b, 131_1c, and 131_1d. The plurality of patch antenna elements 131_1a, 131_1b, 131_1c, and 131_1d may be arranged in a 2×2 array. According to an embodiment, the first antenna array 131_1 may be arranged on a surface of the first antenna module 131 oriented in a first direction. Accordingly, the first antenna array 131_1 may form a beam in the first direction.

According to an embodiment, the second antenna array 131_3 may include a first dipole antenna element 131_3a and a second dipole antenna element 131_3b. According to an embodiment, the second antenna array 131_3 may be arranged on a side surface of the first antenna module 131. Accordingly, the first dipole antenna element 131_3a and the second dipole antenna element 131_3b may form a beam in a second direction.

According to an embodiment, the third antenna array 131_5 may include a third dipole antenna element 131_5a and a fourth dipole antenna element 131_5b. According to an embodiment, the third antenna array 131_5 may be arranged on a side surface that is different from the side surface on which the second antenna array 131_3 is arranged. The third antenna array 131_5 may be arranged on a side surface adjacent to the second antenna array 131_3. Accordingly, the third dipole antenna element 131_5a and the fourth dipole antenna element 131_5b may form a beam in a third direction. For example, the third direction may be perpendicular to the second direction. The second direction and the third direction may be perpendicular to the first direction.

According to an embodiment, the first antenna module 131 may be arranged so that the first antenna array 131_1 is oriented towards the second plate 111b of the first housing 111. For example, the first antenna module 131 may be arranged so that the first antenna array 131_1 is closer to the second plate 111b than to the first plate 111a. Accordingly, the first antenna module 131 may form a beam in the direction of the second plate 111b through the first antenna array 131_1.

According to an embodiment, the first antenna module 131 may be arranged so that the second antenna array 131_3 is oriented towards a side surface 111c of the first housing 111. Accordingly, the first antenna module 131 may form a beam towards the side surface 111c of the first housing 111 through the second antenna array 131_3. According to an embodiment, the first antenna module 131 may be arranged so that the third antenna array 131_5 is oriented towards another side surface 111d of the first housing 111. Accordingly, the first antenna module 131 may form a beam towards the other side surface 111d of the first housing 111 through the third antenna array 131_5. According to an embodiment, the plurality of side surfaces 111c and 111d of the first housing 111 may be surfaces formed between the first plate 111a and the second plate 111b.

According to an embodiment, the third antenna module 135 may be located in the second housing 113, and may include, like the first antenna module 131, a fourth antenna array, a fifth antenna array, and a sixth antenna array. The fourth antenna array may include a plurality of patch antenna elements. The fifth antenna array and the sixth antenna array may include a plurality of dipole antenna elements.

Referring to FIG. 5B, the first antenna module 131 included in the electronic device 100 may include, instead of the second antenna array 131_3 of FIG. 5A, a second' antenna array 131_3' including patch antenna elements. For example, the electronic device 100 may include not only a plurality of dipole antennas but also additional patch antenna elements. The second antenna module, the third antenna module 135, and the fourth antenna module may have substantially the same structure as the first antenna module 131. The following descriptions are focused on differences compared to the electronic device of FIG. 5A.

According to an embodiment, the second' antenna array 131_3 may include a plurality of patch antenna elements 131_3a' and 131_3b'. The plurality of patch antenna elements 131_3a' and 131_3b' may be arranged on a separate PCB 131a. The separate PCB 131a may be connected via an FPCB to a PCB on which the first antenna array 131_1 is arranged. In an embodiment, the plurality of patch antenna elements 131_3a' and 131_3b' may be arranged in a 1×2 array. According to an embodiment, the second' antenna array 131_3' may be arranged on a surface oriented in the second direction. Accordingly, the second' antenna array 131_3' may form a beam in the second direction.

According to an embodiment, the second' antenna array 131_3' may be arranged on a side surface that is different from the side surface on which the third antenna array 131_5 is arranged. Accordingly, the second' antenna array 131_3' may form a beam in the second direction.

According to an embodiment, the first antenna module 131 may be arranged so that the second' antenna array 131_3' is oriented towards the side surface 111c of the first housing 111. Accordingly, the first antenna module 131 may form a beam towards the side surface 11c of the first housing 111 through the second' antenna array 131_3', and may form a beam towards the other side surface 111d of the first housing 111 through the third antenna array 131_5. According to an embodiment, the third antenna module 135 may be located in the second housing 113, and may include, like the first antenna module 131, a fourth antenna array, a fifth' antenna array, and/or a sixth antenna module. The third antenna module 135 may include, instead of the fifth antenna array of FIG. 5A, the fifth' antenna array including patch antenna elements.

Figure 6:
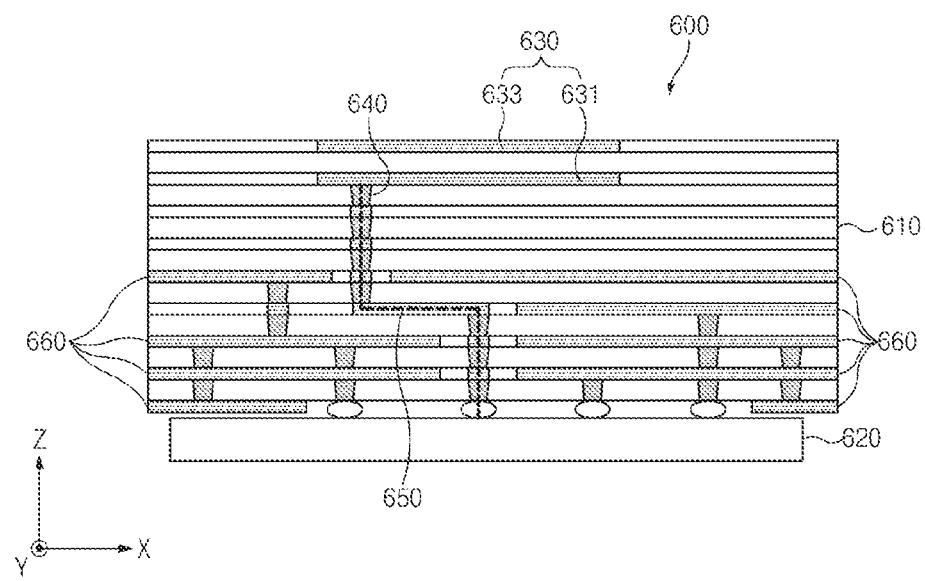
FIG. 6 is a cross-sectional view of an antenna module of an electronic device according to an embodiment.

FIG. 6 is a cross-sectional view of an antenna module of an electronic device according to an embodiment.

Referring to FIG. 6, a 5G antenna module 600 may include a layer structure 610 and a first communication circuit 620. According to various embodiments, the 5G antenna module 600 may further include a component not illustrated in FIG. 6. For example, the 5G antenna module 600 may further include a shield can or non-conductive region. According to an embodiment, the 5G antenna module 600 may be mounted on at least one sub PCB. For example, the layer structure 610 may be formed as a sub PCB, and the first communication circuit 620 may be attached to one surface of the sub PCB. In this case, the first communication circuit 620 and a conductive patch 631 of an antenna element 630 may be mounted on the same sub PCB.

According to an embodiment, the first communication circuit 620 may be supplied with power from an external component. The external component, for example, may be a main PCB on which a processor (e.g., the processor 140 of FIG. 3) and the like are arranged. According to an embodiment, the first communication circuit 620 may supply a current for transmitting/receiving a signal of a specified frequency band (e.g., frequency band between 3 GHz and 100 GHz) to an antenna element 630 using the supplied power.

According to an embodiment, the antenna element 630 may correspond to the first patch antenna element 131_1a of FIG. 5A. According to an embodiment, the antenna module 600 may separately include a dipole antenna element (not shown) (e.g., the dipole antenna element 131_3 of FIG. 5) extending from a side surface of the sub PCB.

According to an embodiment, the layer structure 610 may include a plurality of layers. For example, the layer structure 610 may include at least one layer including the conductive patch 631 or at least one layer including a coupling conductive patch 633. For another example, the layer structure 610 may include at least one layer including at least one conductive region 660.

According to an embodiment, the conductive patch 631 may be a conductive material which generates electromagnetic resonance by being fed by the first communication circuit 620. According to an embodiment, the coupling conductive patch 633, which is a conductive material, may guide an electromagnetic signal radiated from the fed conductive patch 631.

According to an embodiment, the conductive patch 631 may be fed through a plurality of vias 640 formed between a plurality of layers in the layer structure 610. In an embodiment, the via 640 may be construed as a passage formed in a part of the layer structure 610 and passing through between the layers. For example, the conductive patch 631 and the first communication circuit 620 may be electrically connected through a feeding line 650 including at least one conductive region 660 and the via 640, and the conductive patch 631 may be fed through the feeding line 650. If the conductive patch 631 is fed by the first communication circuit 620, the electronic device 100 may perform communication using a millimeter wave signal.

According to an embodiment, the at least one conductive region 660 may be electrically connected to the first communication circuit 620, and may operate as a ground for the first communication circuit 620 and the conductive patch 631. According to an embodiment, the at least one conductive region 660 may operate as at least a part of a radiator which is fed by a second communication circuit to transmit or receive a signal of a specified frequency band to or from the second communication circuit. In an embodiment, the at least one conductive region 660 may be electrically connected to the outside of the 5G antenna module 600, for example, the second communication circuit included in a PCB, and may be fed by the second communication circuit.

Figure 7:
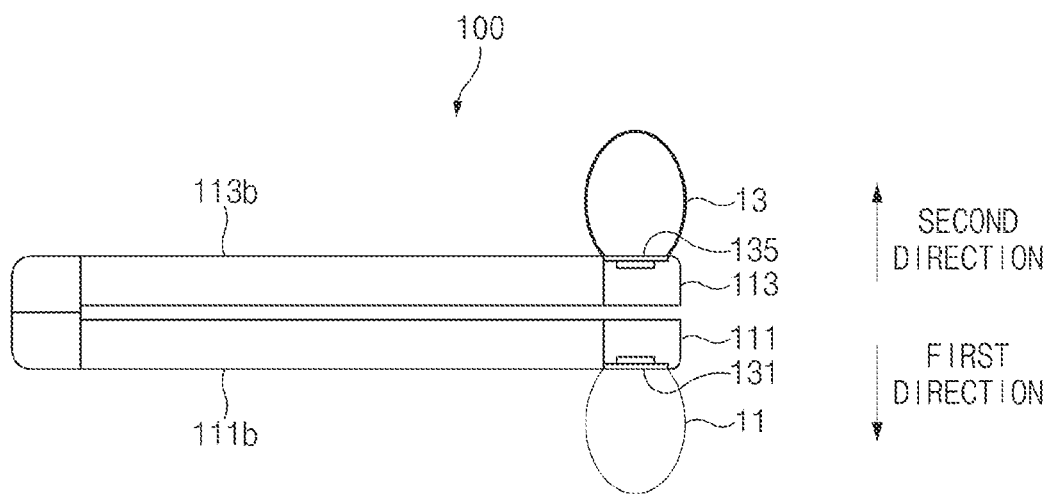
FIG. 7 is a diagram illustrating beams formed by patch antenna element modules when viewed from the side of an electronic device according to an embodiment.

FIG. 7 is a diagram illustrating beams formed by patch antenna element modules when viewed from the side of an electronic device according to an embodiment.

Referring to FIG. 7, the first antenna module 131 and the third antenna module 135 may form beams in different directions in the folded state of the electronic device 100. For another example, a second antenna module (e.g., the second antenna module 133 of FIG. 4) and a fourth antenna module (e.g., the fourth antenna module 137 of FIG. 4) may form a beam in a similar manner to that of the first antenna module 131 and the third antenna module 135.

According to an embodiment, the first antenna module 131 located in the first housing 111 may form a first beam 11 in the direction of the second plate 111b of the first housing 111. For example, the first antenna module 131 may form the first beam 11 in the first direction in the folded state. The first beam 11, for example, may be formed by a plurality of patch antenna elements (e.g., the first antenna array 131_1 of FIG. 5) of the first antenna module 131.

According to an embodiment, the third antenna module 135 located in the second housing 113 may form a second beam 13 in the direction of the fourth plate 113b of the second housing 113. For example, the third antenna module 135 may form the second beam 13 in the second direction in the folded state. The second beam 13, for example, may be formed by a plurality of patch antenna elements (e.g., the second antenna array 131_3 of FIG. 5) of the third antenna module 135.

According to an embodiment, the first beam 11 and the second beam 13 may be formed in opposite directions in the folded state of the electronic device 100, thus reducing interference. Therefore, the first antenna module 131 and the third antenna module 135 may form the first beam 11 and the second beam 13 so as to smoothly transmit/receive a signal in a specified direction.

The electronic device 100 according to an embodiment of the present invention may smoothly transmit/receive signals since a plurality of antenna modules are arranged so that beams that are formed by patch antenna elements in specified directions to transmit/receive 5G signals cause less interference in the open state and folded state.

FIG. 8 is a diagram illustrating arrangement of antenna modules in an electronic device according to an embodiment.

Referring to FIG. 8, a plurality of antenna modules 830 of an electronic device 800 may be arranged so that formed beams do not interfere with each other. The above descriptions of the electronic device 100 provided above with reference to FIGS. 1 to 3 may be likewise applied to the electronic device 800. However, the plurality of antenna modules 830 of the electronic device 800 may have a structure different from that of the antenna module 130 of FIG. 4.

According to an embodiment, the electronic device 800 may include the plurality of antenna modules 830. The plurality of antenna modules 830 may include a first antenna module 831, a second antenna module 833, a third antenna module 835, and/or a fourth antenna module 837. According to an embodiment, the plurality of antenna modules 830 may be located in a housing 810. For example, the first antenna module 831 and/or the second antenna module 833 may be arranged in a first housing 811. The third antenna module 835 and/or the fourth antenna module 837 may be located in the second housing 813.

According to an embodiment, the electronic device 800 may include a second display 823 including a third part 823a exposed to a second plate 811b of the first housing 811 and a fourth part 823b exposed to a fourth plate 813b of the second housing 813.

According to an embodiment, the plurality of antenna modules 830 may have substantially the same structure. For example, the plurality of antenna modules 830 may include a plurality of patch antenna elements and/or a plurality of dipole antenna elements. The plurality of patch antenna elements and/or dipole antenna elements may form beams in various directions. According to an embodiment, the plurality of dipole antennas included in the plurality of antenna modules 830 may form beams in one direction unlike the plurality of dipole antennas included in the plurality of antenna modules 130 of FIG. 4. Structures of the plurality of antenna modules 830 and beams formed by the plurality of antenna modules 830 will be described in detail with reference to FIGS. 9 to 11.

According to an embodiment, the plurality of antenna modules 830 may be arranged so that formed beams do not interfere with each other in the open state of FIG. 2A. For example, the plurality of antenna modules 830 may be arranged in each corner of the housing 810. The first antenna module 831 and the second antenna module 833 may be respectively arranged in a first corner ① and a second corner ② of the first housing 811. The third antenna module 835 and the fourth antenna module 837 may be respectively arranged in a third corner ③ and a fourth corner ④ of the second housing 813. For example, the first corner ①, the second corner ②, the third corner ③, and the fourth corner ④ may be apart from the axis A-A'.

According to an embodiment, the plurality of antenna modules 830 may be arranged so that formed beams do not interfere with each other in the folded state of FIG. 2B. In the case where the plurality of antenna modules 830 are arranged in the corners of the housing 830, the first antenna module 831 and the second antenna module 833 may be respectively adjacent to the third antenna module 835 and the fourth antenna module 837 in the folded state of FIG. 2B. For example, when viewed above the second plate 811b, the first antenna module 831 may at least partially overlap the third antenna module 835, and the second antenna module 833 may at least partially overlap the fourth antenna module 837. Therefore, the plurality of antenna modules 830 present in similar locations may be arranged so as to form beams in different directions in order to minimize interference. For example, the first antenna module 831 and the second antenna module 833 may be arranged so that patch antenna elements form beams in the direction of the second plate 811b and dipole antenna elements form beams towards one side surface. The third antenna module 835 and the fourth antenna module 837 may be arranged so that patch antenna elements form beams in the direction of the fourth plate 813b and dipole antenna elements form beams towards a side surface different from the one side surface.

Figure 9:
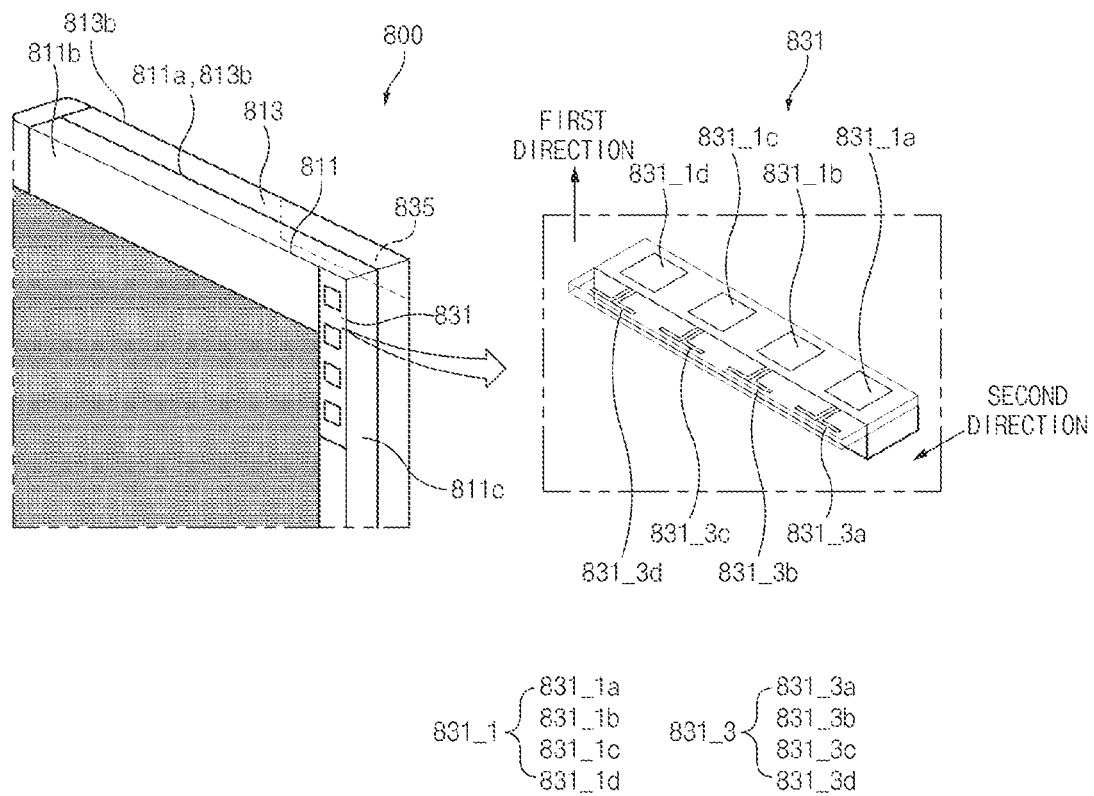
FIG. 9 is a diagram illustrating an antenna module of an electronic device according to an embodiment.

FIG. 9 is a diagram illustrating an antenna module of an electronic device according to an embodiment.

Referring to FIG. 9, the first antenna module 831 included in the electronic device 800 may include a plurality of patch antenna elements and a plurality of dipole antenna elements. A second antenna module (e.g., the second antenna module 833 of FIG. 8), the third antenna module 835, and a fourth antenna module (e.g., the fourth antenna module 837 of FIG. 8) may have substantially the same structure as the first antenna module 831.

According to an embodiment, the first antenna module 831 may be arranged in a corner of the first housing 811. According to an embodiment, the first antenna module 831 may include a first antenna array 831_1 and/or a second antenna array 831_3.

According to an embodiment, the first antenna array 131_1 may include at least a portion of a plurality of patch antenna elements 831_1a, 831_1b, 831_1c, and 831_1d. The plurality of patch antenna elements 831_1a, 831_1b, 831_1c, and 831_1d may be arranged in a 1×4 array. According to an embodiment, the first antenna array 831_1 may be arranged on a surface the first antenna module 831 oriented in a first direction. Accordingly, the first antenna array 831_1 may form a beam in the first direction.

According to an embodiment, the second antenna array 831_3 may include at least a portion of a plurality of dipole antenna elements 831_3a, 831_3b, 831_3c, and 831_3d. According to an embodiment, the second antenna array 831_3 may be arranged on a side surface of the first antenna module 831. For example, a first dipole antenna element 831_3a, a second dipole antenna element 831_3b, a third dipole antenna element 831_3c, and/or a fourth dipole antenna element 831_3d may be arranged on the same side surface. Therefore, the first dipole antenna element 831_3a, the second dipole antenna element 831_3b, the third dipole antenna elements 831_3c, and/or the fourth dipole antenna element 831_3d may form a beam in a second direction. For example, unlike the second antenna array 131_3 of FIG. 5, the second antenna array 831_3 may form a beam in one direction. The second direction, for example, may be perpendicular to the first direction in which the first antenna array 831_1 is oriented.

According to an embodiment, the first antenna module 831 may be arranged so that the first antenna array 831_1 is oriented towards the second plate 811b of the first housing 811. For example, the first antenna module 831 may be arranged so that the first antenna array 831_1 is close to the second plate 811b of the first housing 811. Accordingly, the first antenna module 831 may form a beam in the direction of the second plate 811b through the first antenna array 831_1.

According to an embodiment, the first antenna module 831 may be arranged so that the second antenna array 831_3 is oriented towards a side surface 811c of the first housing 831. The side surface 811c of the first housing 811 may be a surface formed between the first plate 811a and the second plate 811b. Accordingly, the first antenna module 831 may form a beam towards the one side surface 811c of the first housing 811 through the second antenna array 831_3.

According to an embodiment, the third antenna module 835 may be located in the second housing 813, and may include, like the first antenna module 831, a third antenna array and a fourth antenna array. The third antenna array may include a plurality of patch antenna elements. The fourth antenna array may include a plurality of dipole antenna elements.

According to an embodiment, the third antenna module 835 may be arranged so that the third antenna array is oriented towards the fourth plate 813b of the second housing 813. For example, the third antenna module 835 may form a beam in the direction of the fourth plate 813b through the third antenna array.

According to an embodiment, the third antenna module 835 may be arranged so that the fourth antenna array is oriented towards a side surface that is different from the side surface which the second antenna array 831_3 of the first antenna module 831 is oriented towards. For example, the third antenna module 835 may be arranged so that arrangement of the third antenna array of the third antenna module 835 is perpendicular to arrangement of the first antenna array 831_1 of the first antenna module 831. Accordingly, the third antenna module 835 may form a beam through the fourth antenna array in a direction different from the direction in which the second antenna array 831_3 forms a beam.

Figure 10:
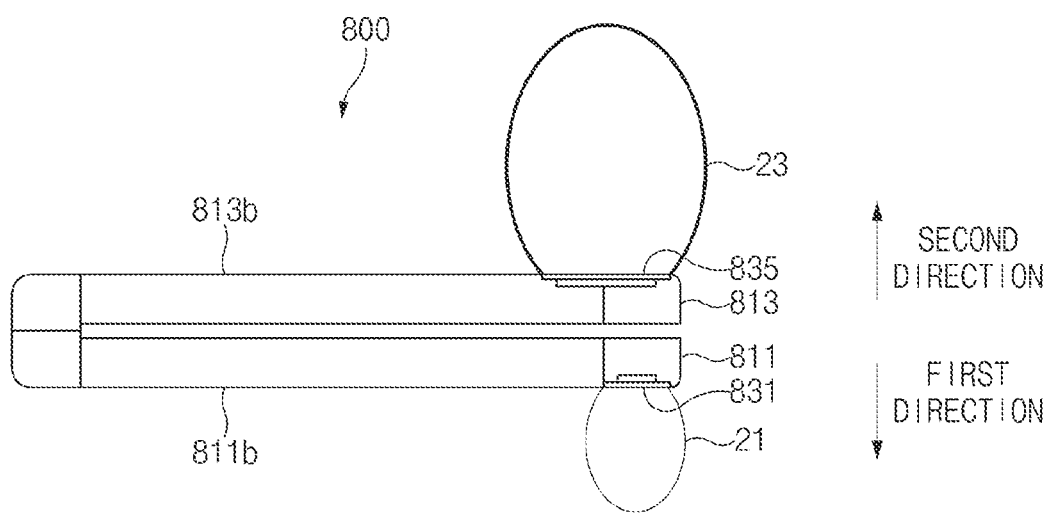
FIG. 10 is a diagram illustrating beams formed by patch antenna elements when viewed from the side of an electronic device according to an embodiment.

FIG. 10 is a diagram illustrating beams formed by patch antenna elements when viewed from the side of an electronic device according to an embodiment.

Referring to FIG. 10, the first antenna module 831 and the third antenna module 835 may form beams in different directions in the folded state of the electronic device 800. For another example, the second antenna module 833 and the fourth antenna module 837 may form a beam in a similar manner to that of the first antenna module 831 and the third antenna module 835.

According to an embodiment, the first antenna module 831 located in the first housing 811 may form a first beam 21 in the direction of the second plate 811b of the first housing 811. For example, the first antenna module 831 may form the first beam 21 in a first direction in the folded state. The first beam 21, for example, may be formed by a plurality of patch antenna elements (e.g., the first antenna array 831_1 of FIG. 9) of the first antenna module 831.

According to an embodiment, the third antenna module 835 located in the second housing 813 may form a second beam 23 in the direction of the fourth plate 813b of the second housing 813. For example, the third antenna module 835 may form the second beam 23 in a second direction in the folded state. The second beam 23, for example, may be formed by a plurality of patch antenna elements of the third antenna module 835.

According to an embodiment, like the first beam 11 and the second beam 13 of FIG. 7, the first beam 21 and the second beam 23 may be formed in opposite directions in the folded state of the electronic device 800, thus reducing interference. Therefore, the first antenna module 831 and the third antenna module 835 may form the first beam 21 and the second beam 23 so as to smoothly transmit/receive a signal in a specified direction.

Figure 11:
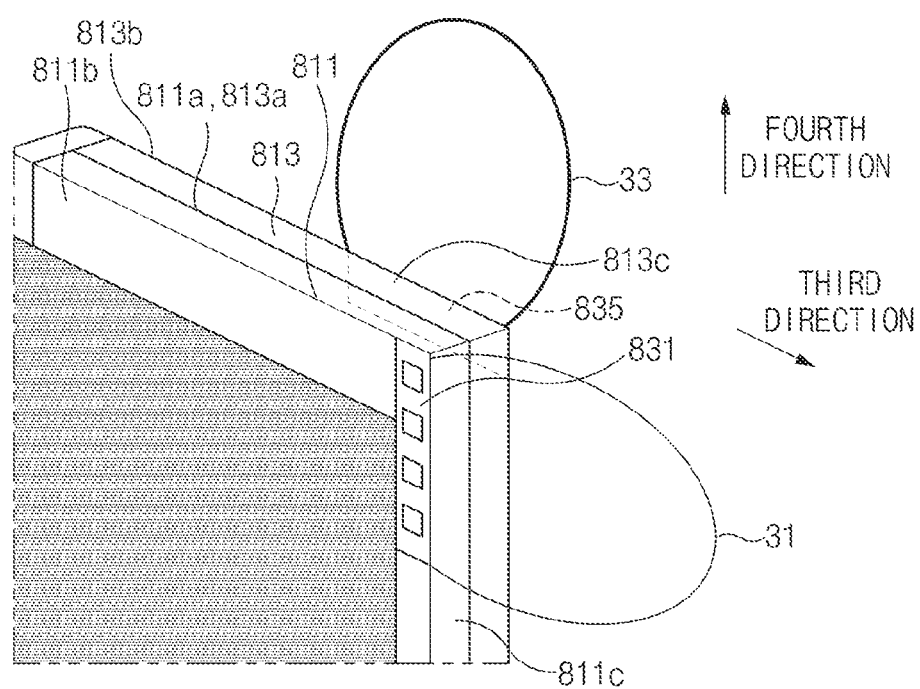
FIG. 11 a diagram illustrating beams formed by dipole antenna modules in a diagonal side view of an electronic device according to an embodiment.

FIG. 11 a diagram illustrating beams formed by dipole antenna modules in a diagonal side view of an electronic device according to an embodiment.

Referring to FIG. 11, the first antenna module 831 and the third antenna module 835 may form beams in different directions in the folded state of the electronic device 800. For another example, the second antenna module 833 and the fourth antenna module 837 may form a beam in a similar manner to that of the first antenna module 831 and the third antenna module 835.

According to an embodiment, the first antenna module 831 located in the first housing 811 may form a third beam 31 in a third direction. For example, the first antenna module 831 may form the third beam 31 towards one side surface 811c of the first housing 811. The third beam 31 may be formed by a plurality of dipole antenna elements (e.g., the second antenna array 831_3 of FIG. 9) of the first antenna module 831.

According to an embodiment, the third antenna module 835 located in the second housing 813 may form a fourth beam 33 in a fourth direction. For example, the third antenna module 835 may form the fourth beam 33 towards another side surface 813c of the second housing 813. The fourth beam 33 may be formed by a plurality of dipole antenna elements of the second antenna module 831. The first antenna module 831 and the third antenna module 835 may form the third beam 31 and the fourth beam 33 so as to smoothly transmit/receive a signal in a specified direction.

The electronic device 800 according to an embodiment of the present invention may smoothly transmit/receive signals since a plurality of antenna modules are arranged so that beams that are formed not only by patch antenna elements but also by dipole antenna elements in specified directions to transmit/receive 5G signals cause less interference in the open state and folded state.

Figure 12:
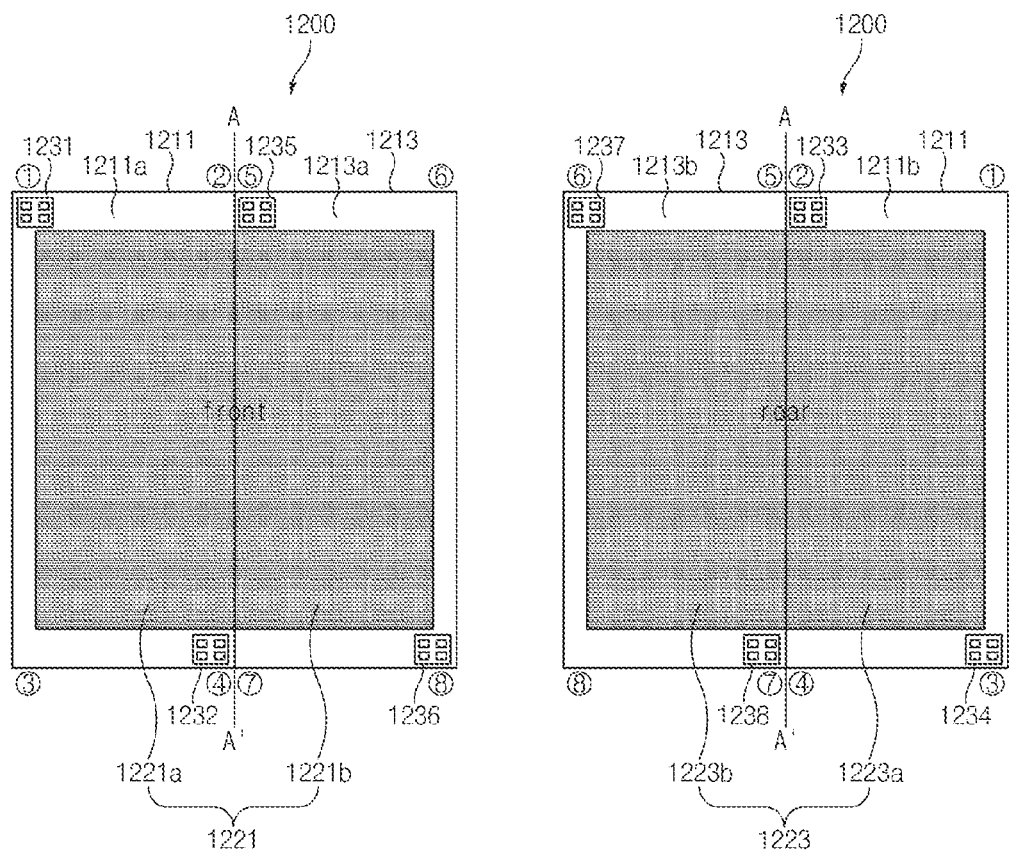
FIG. 12 is a diagram illustrating arrangement of antenna modules on a front side and rear side of an electronic device according to an embodiment.
Figure 12:
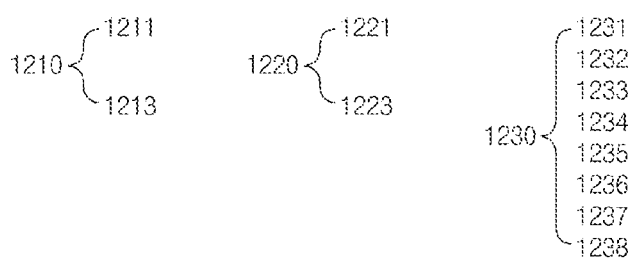

FIG. 12 is a diagram illustrating arrangement of antenna modules on a front side and rear side of an electronic device according to an embodiment.

Referring to FIG. 12, a plurality of antenna modules 1230 of an electronic device 1200 may be arranged so as to reduce interference caused by formed beams. The above descriptions of the electronic device 100 provided above with reference to FIGS. 1 to 3 may be likewise applied to the electronic device 1200. However, the electronic device 1200 may have a larger number of installed antenna modules 830 than that of the electronic device 100 of FIG. 4.

According to an embodiment, the electronic device 1200 may include the plurality of antenna modules 1230. The plurality of antenna modules 1230 may include a first antenna module 1231, a second antenna module 1232, a third antenna module 1233, a fourth antenna module 1234, a fifth antenna module 1235, a sixth antenna module 1236, a seventh antenna module 1237, and/or an eighth antenna module 1238. According to an embodiment, the plurality of antenna modules 1230 may be located in a housing 1210. For example, the first antenna module 1231, the second antenna module 1232, the third antenna module 1233, and/or the fourth antenna module 1234 may be located in the first housing 1210. The fifth antenna module 1235, the sixth antenna module 1236, the seventh antenna module 1237, and/or the eighth antenna module 1238 may be located in a second housing 1213.

According to an embodiment, the electronic device 1200 may include a first display 1221 including a first part 1221a exposed to a first plate 1211a of the first housing 1211 and a second part 1221b exposed to a third plate 1213a of the second housing 1213. According to an embodiment, the electronic device 1200 may include a second display 1223 including a third part 1223a exposed to a second plate 1211b of the first housing 1211 and a fourth part 1223b exposed to a fourth plate 1213b of the second housing 1213. According to an embodiment, the display 1220 may include the first display 1221 and the second display 1223.

According to an embodiment, the plurality of antenna modules 1230 may have substantially the same structure. For example, the plurality of antenna modules 1230 may be substantially the same as the plurality of antenna modules 130 of FIG. 4.

According to an embodiment, the plurality of antenna modules 1230 may be arranged so as to reduce interference between beams formed in the open state. For example, the plurality of antenna modules 1230 may be arranged on a front side or rear side of the electronic device 1200 (or the housing 1210).

According to an embodiment, the first antenna module 1231 and the second antenna module 1232 may be respectively arranged in a first corner ① and a fourth corner ④ on the front side of the first housing 1211. The fifth antenna module 1235 and the sixth antenna module 1236 may be respectively arranged in a fifth corner ⑤ and an eighth corner ⑧ on the front side of the second housing 1213. Accordingly, the first antenna module 1231, the second antenna module 1232, the fifth antenna module 1235, and/or the sixth antenna module 1236 may form a beam in a front direction of the electronic device 1200 in the open state.

According to an embodiment, the third antenna module 1233 and the fourth antenna module 1234 may be respectively arranged in a second corner ② and a third corner ③ on the rear side of the second housing 1213. The seventh antenna module 1237 and the eighth antenna module 1238 may be respectively arranged in a sixth corner ⑥ and a seventh corner ⑦ on the front side of the second housing 1213. Accordingly, the third antenna module 1233, the fourth antenna module 1234, the seventh antenna module 1237, and the eighth antenna module 1238 may form a beam in a rear direction of the electronic device 1200 in the open state.

According to an embodiment, beams generated by some of the plurality of antenna modules 1230 may overlap each other in the folded state, but are formed in the same direction and thus may cause less interference compared to beams formed in opposite directions. According to another embodiment, the electronic device 1200 may turn off at least one of the plurality of antenna modules which form overlapping beams in the folded state.

Figure 13:
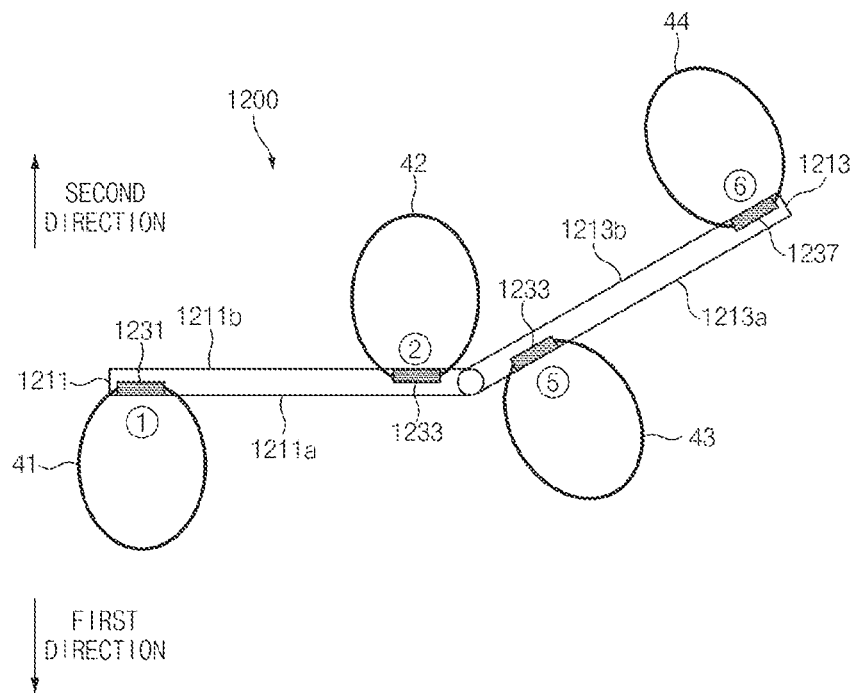
FIG. 13 is a diagram illustrating beams formed by patch antenna elements when viewed from the side of an electronic device according to an embodiment.
Figure 13:
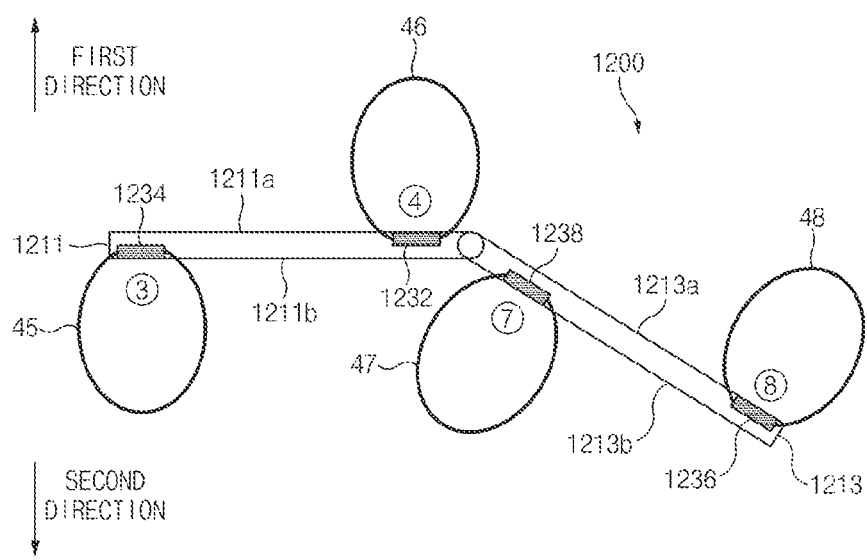

FIG. 13 is a diagram illustrating beams formed by patch antenna elements when viewed from the side of an electronic device according to an embodiment.

Referring to FIG. 13, adjacent antenna modules may form beams in different directions in the open state of the electronic device 1200.

According to an embodiment, the first antenna module 1231 located in the first corner ① of the first housing 1211 may form a first beam 41 in the direction of the first plate 1211a. According to an embodiment, the third antenna module 1233 located in the second corner ② of the first housing 1211 may form a second beam 42 in the direction of the second plate 1211b. According to an embodiment, the fifth antenna module 1235 located in the fifth corner ⑤ of the second housing 1213 may form a third beam 43 in the direction of the third plate 1213a. According to an embodiment, the seventh antenna module 1237 located in the sixth corner ⑥ of the second housing 1213 may form a fourth beam 44 in the direction of the fourth plate 1213b.

According to an embodiment, the first beam 41 and the third beam 43 may be formed in a first direction in the open state of the electronic device 1200, and the second beam 42 and the fourth beam 44 may be formed in a second direction. Therefore, adjacent beams among the first beam 41, the second beam 42, the third beam 43, and the fourth beam 44 may be formed in opposite directions, thus reducing interference.

According to an embodiment, the first beam 41 and the fourth beam 44 may be formed in the first direction in the folded state of the electronic device 1200, and the second beam 42 and the third beam 43 may be formed in the second direction. Accordingly, overlapping beams among the first beam 41, the second beam 42, the third beam 43, and the fourth beam 44 may be formed in the same direction, thus reducing interference. For another example, the electronic device 1200 may turn off the second antenna module 1233 and the seventh antenna module 1237 so as to form only one of overlapping beams.

According to an embodiment, the fourth antenna module 1234 located in the third corner ③ of the first housing 1211 may form a fifth beam 45 in the direction of the second plate 1211b. According to an embodiment, the second antenna module 1232 located in the fourth corner ④ of the first housing 1211 may form a sixth beam 46 in the direction of the first plate 1211*a*. According to an embodiment, the eighth antenna module 1238 located in the seventh corner ⑦ of the second housing 1213 may form a seventh beam 47 in the direction of the fourth plate 1213*b*. According to an embodiment, the sixth antenna module 1236 located in the eighth corner ⑧ of the second housing 1213 may form an eighth beam 48 in the direction of the third plate 1213*a*.

According to an embodiment, the fifth beam 45 and the seventh beam 47 may be formed in the second direction in the open state of the electronic device 1200, and the sixth beam 46 and the eighth beam 48 may be formed in the first direction. Therefore, adjacent beams among the fifth beam 45, the sixth beam 46, the seventh beam 47, and the eighth beam 48 may be formed in opposite directions, thus reducing interference.

According to an embodiment, the fifth beam 45 and the eighth beam 48 may be formed in the second direction in the folded state of the electronic device 1200, and the sixth beam 46 and the seventh beam 47 may be formed in the first direction in the folded state of the electronic device 1200. Accordingly, overlapping beams among the fifth beam 45, the sixth beam 46, the seventh beam 47, and the eighth beam 48 may be formed in the same direction, thus reducing interference. For another example, the electronic device 1200 may turn off the fourth antenna module 1234 and/or the eighth antenna module 1238 so as to form only one of overlapping beams.

Figure 14:
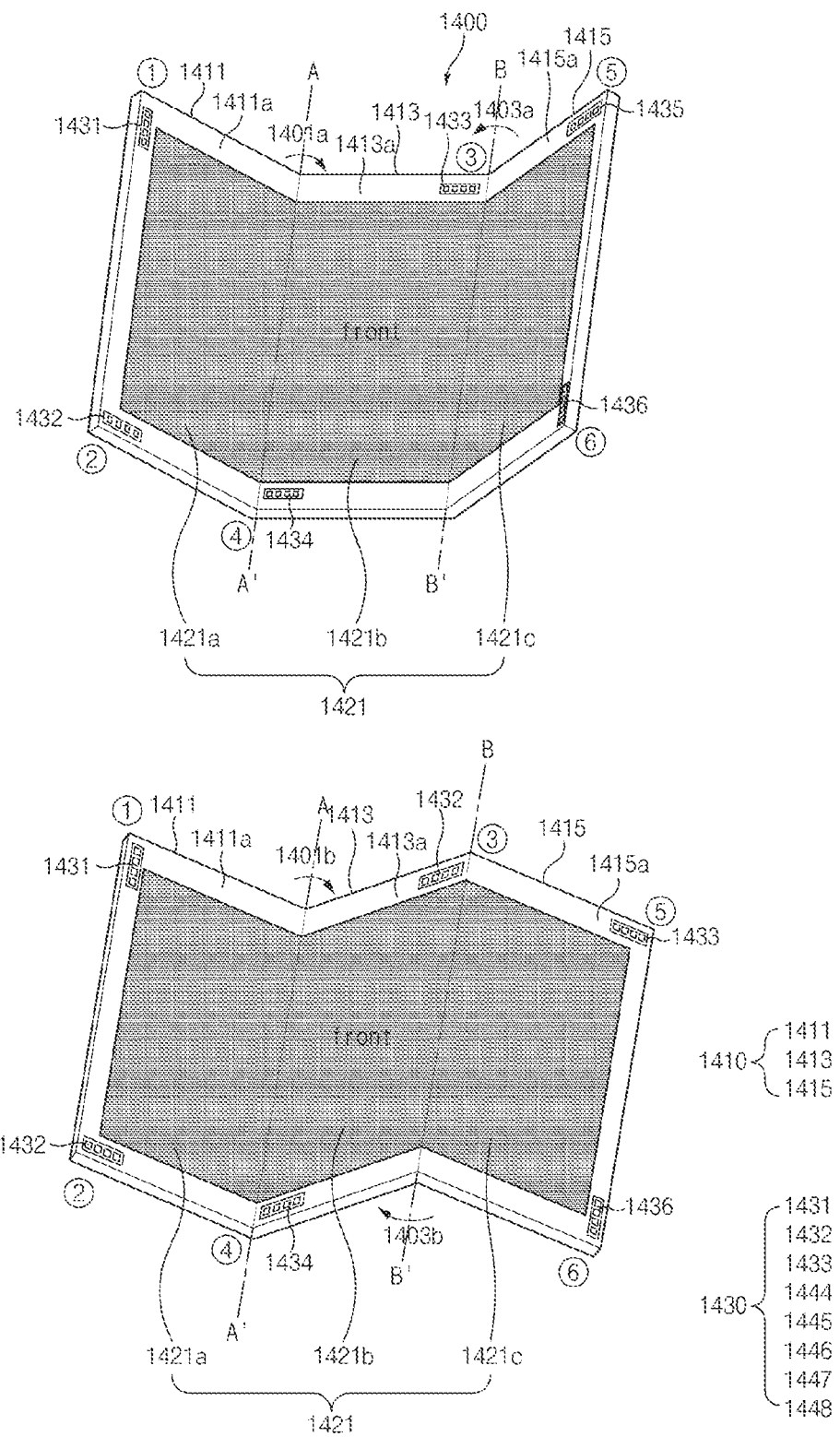
FIG. 14 is a diagram illustrating antenna modules arranged in a multi-foldable electronic device according to an embodiment.

FIG. 14 is a diagram illustrating antenna modules arranged in a multi-foldable electronic device according to an embodiment.

Referring to FIG. 14, a plurality of antenna modules 1430 of an electronic device 1400 may be arranged so as to minimize interference caused by formed beams. The above descriptions of the electronic device 100 provided above with reference to FIGS. 1 to 3 may be likewise applied to the electronic device 1400. However, the electronic device 1400 may include one more housing compared to the electronic device 100 of FIG. 4.

According to an embodiment, the electronic device 1400 may include the plurality of antenna modules 1430. The plurality of antenna modules 1430 may include a first antenna module 1431, a second antenna module 1432, a third antenna module 1433, a fourth antenna module 1434, a fifth antenna module 1435, and/or a sixth antenna module 1436. According to an embodiment, the plurality of antenna modules 1430 may be located in a housing 1410. For example, the first antenna module 1431 and/or the second antenna module 1432 may be arranged in a first housing 1411. The third antenna module 1433 and/or the fourth antenna module 1434 may be located in a second housing 1413. The fifth antenna module 1435 and/or the sixth antenna module 1436 may be located in a third housing 1415.

According to an embodiment, the electronic device 1400 may include a first display 1421 including a first part 1421*a* exposed to a first plate 1411*a* of the first housing 1411, a second part 1421*b* exposed to a second plate 1413*a* of the second housing 1413, and a third part 1421*c* exposed to a third plate 1415*a* of the third housing 1415.

According to an embodiment, the plurality of antenna modules 1430 may have substantially the same structure. For example, the plurality of antenna modules 1430 may be substantially the same as the plurality of antenna modules 830 of FIG. 8.

According to an embodiment, the plurality of antenna modules 1430 may be arranged on a front side of the housing 1410. According to an embodiment, the first antenna module 1431 and the second antenna module 1432 may be respectively arranged in a first corner ① and a second corner ② of the first housing 1411. The third antenna module 1433 and the fourth antenna module 1434 may be respectively arranged in a third corner ③ and a fourth corner ④ of the second housing 1413. The fifth antenna module 1435 and the sixth antenna module 1436 may be respectively arranged in a fifth corner ⑤ and a sixth corner ⑥ of the third housing 1415. Accordingly, the first antenna module 1431, the second antenna module 1432, the third antenna module 1433, the fourth antenna module 1434, the fifth antenna module 1435, and/or the sixth antenna module 1436 may form a beam in a front direction of the electronic device 1400 in the open state.

According to an embodiment, the electronic device 1400 may be folded with respect to a first axis A-A' and a second axis B-B'. For example, the electronic device 1400 may be folded in a first direction 1401*a* with respect to the first axis A-A' and may be folded in a second direction 1403*a* with respect to the second axis B-B'. For another example, the electronic device 1400 may be folded in a first direction 1401*b* with respect to the first axis A-A' and may be folded in a third direction 1403*b* with respect to the second axis B-B'.

According to an embodiment, the plurality of antenna modules 1430 may be arranged so as to reduce interference between beams formed in the folded state. For example, the plurality of antenna modules 1430 may be arranged so that only some of beams formed by patch antenna elements of adjacent antenna modules (e.g., the first antenna element 1431 and the third antenna element 1433, the fourth antenna element 1434 and the sixth antenna element 1436) overlap in the folded state. For another example, the plurality of antenna modules 1430 may be arranged so that dipole antenna elements of adjacent antenna modules form beams towards different side surfaces in the folded state.

The electronic device 100 according to various embodiments of the present invention may include: a housing 101 including a first housing structure 111 which includes a first plate 111*a* and a second plate 111*b* oriented in an opposite direction to the first plate 111*a* and a second housing structure 113 which is bendable over the first housing structure 111 with respect to an axis, and includes a third plate 113*a* and a fourth plate 113*b* oriented in an opposite direction to the third plate 113*a*, wherein the third plate 113*a* faces the first plate 111*a* or the fourth plate 113*b* faces the second plate 111*b* in a folded state of the housing 101; a display 120 including a first part 121*a* located in the first housing structure 111 and viewable through the first plate 111*a* and a second part 121*b* located in the second housing structure 113 and viewable through the third plate 113*a*; a first antenna structure 131 including a first array 131_1 of antenna elements closer to one of the first plate 111*a* and the second plate 111*b* than to the other of the first plate 111*a* and the second plate 111*b* and located in the first housing structure 111; a second antenna structure 133 including a second array of antenna elements closer to one of the third plate 113*a* and the fourth plate 113*b* than to the other of the third plate 113*a* and the fourth plate 113*b* and located in the second housing structure 113; and at least one wireless communication circuit 130*b* electrically connected to the first array 131_1 and the second array and configured to transmit and/or receive a signal having a frequency between 3 GHz and 100 GHz.

In the electronic device 100 according to an embodiment of the present invention, in the folded state, the third plate 113*a* may face the first plate 111*a*, the first array 131_1 may be closer to the second plate 111*b* than to the first plate 111*a*, and the second array may be closer to the fourth plate 113*b* than to the third plate 113*a*.

In the electronic device 100 according to an embodiment of the present invention, the wireless communication circuit may be configured so that the first array 131_1 forms a first beam in a direction to the first plate 111*a* or the second plate 111*b* to which the first array 131_1 is arranged closer, and the second array forms a second beam in a direction to the third plate 113*a* or the fourth plate 113*b* to which the second array is arranged closer.

In the electronic device 100 according to an embodiment of the present invention, the first antenna structure 131 may be arranged in a corner of the first housing structure 111, and the second antenna structure 133 may be arranged in a corner of the second housing structure 113.

In the electronic device 100 according to an embodiment of the present invention, in the folded state, the first array 131_1 may be aligned in a first direction, and the second array may be aligned in a second direction different from the first direction.

In the electronic device 100 according to an embodiment of the present invention, in the folded state, the first array 131_1 may at least partially overlap the second array when viewed above the first plate 111*a*.

In the electronic device 100 according to various embodiments of the present invention, the first antenna structure 131 may further include a third array of antenna elements forming a dipole antenna, and the second antenna structure 133 may further include a fourth array of antenna elements forming a dipole antenna.

In the electronic device 100 according to an embodiment of the present invention, the wireless communication circuit may be configured so that the third array forms a third beam towards a side surface formed between the first plate 111*a* and the second plate 111*b*, and the fourth array forms a fourth beam towards a side surface formed between the third plate 113*a* and the fourth plate, wherein the third beam and the fourth beam may be formed in different directions.

In the electronic device 100 according to various embodiments of the present invention, in the folded state, the third array may be aligned in a third direction, and the fourth array may be aligned in a fourth direction different from the third direction.

In the electronic device 100 according to an embodiment of the present invention, the third array may be aligned in a direction different from a direction in which the first array 131_1 is aligned, and the fourth array may be aligned in a direction different from a direction in which the second array is aligned.

In the electronic device 100 according to an embodiment of the present invention, the antenna elements of the first array 131_1 may form a beam in a first direction in order to receive the signal, the antenna elements of the second array may form a beam in a second direction in order to receive the signal, and the first antenna structure 131 and the second antenna structure 133 may be arranged so that the first direction and the second direction differ from each other in the folded state of the housing 101.

In the electronic device 100 according to an embodiment of the present invention, the display 120 may be a flexible display.

In the electronic device 100 according to an embodiment of the present invention, the display 120 may include a plurality of displays 121 and 123, wherein the plurality of displays 121 and 123 may be respectively arranged in the first housing 111 and the second housing 113.

The electronic device 1200 according to various embodiments of the present invention may include: a housing 1210 including a first housing structure 1211 which includes a first plate 1211*a* and a second plate 1211*b* oriented in an opposite direction to the first plate 1211*a* and a second housing structure 1212 which is bendable over the first housing structure 1211 with respect to an axis, and includes a third plate 1213*a* and a fourth plate 1213*b* oriented in an opposite direction to the third plate 1213*a*, wherein the third plate 1213*a* faces the first plate 1211*a* or the fourth plate 1213*b* faces the second plate 1211*b* in a folded state; a display 1220 including a first part 1221*a* located in the first housing structure 1211 and viewable through the first plate 1211*a* and a second part 1221*b* located in the second housing structure 1212 and viewable through the third plate 1213*a*; a first antenna structure 1231 located in the first housing structure 1211 and including a first array 1231_1 of antenna elements closer to the first plate 1211*a* than to the second plate 1211*b*; a second antenna structure 1233 located in the first housing structure 1211 and including a second array of antenna elements closer to the second plate 1211*b* than to the first plate 1211*a*; a third antenna structure 1235 located in the second housing structure 1212 and including a third array of antenna elements closer to the third plate 1213*a* than to the fourth plate 1213*b*; a fourth antenna structure 1237 located in the second housing structure 1212 and including a fourth array of antenna elements closer to the fourth plate 1213*b* than to the third plate 1213*a*; and at least one wireless communication circuit 130*b* electrically connected to the first array 1231_1 and the second array and configured to transmit and/or receive a signal having a frequency between 3 GHz and 100 GHz.

In the electronic device 1200 according to an embodiment of the present invention, the first antenna structure 1231 and the fourth antenna structure 1237 may be arranged in a corner of the housing 1210, and the second antenna structure 1233 and the third antenna structure 1235 may be arranged adjacent to the axis.

In the electronic device 1200 according to an embodiment of the present invention, the first array 1231_1 may form a first beam in a direction to the first plate 1211*a*, the second array may form a second beam in a direction to the second plate 1211*b*, the third array may form a third beam in a direction to the third plate 1213*a*, and the fourth array may form a fourth beam in a direction to the fourth plate.

In the electronic device 1200 according to an embodiment of the present invention, in the folded state, the first array 1231_1 and the fourth array may be aligned in a first direction, and the second array and the third array may be aligned in a second direction different from the first direction.

In the electronic device 1200 according to various embodiments of the present invention, in the folded state, the first array 1231_1 and the third array may be aligned in a first direction, and the third array and the fourth array may be aligned in a second direction different from the first direction.

In the electronic device 1200 according to an embodiment of the present invention, the first array 1231_1 may at least partially overlap the fourth array when viewed above the first plate 1211*a* in the folded state, and the second array may at least partially overlap the third array when viewed above the third plate 1213*a* in the folded state.

Figure 15:
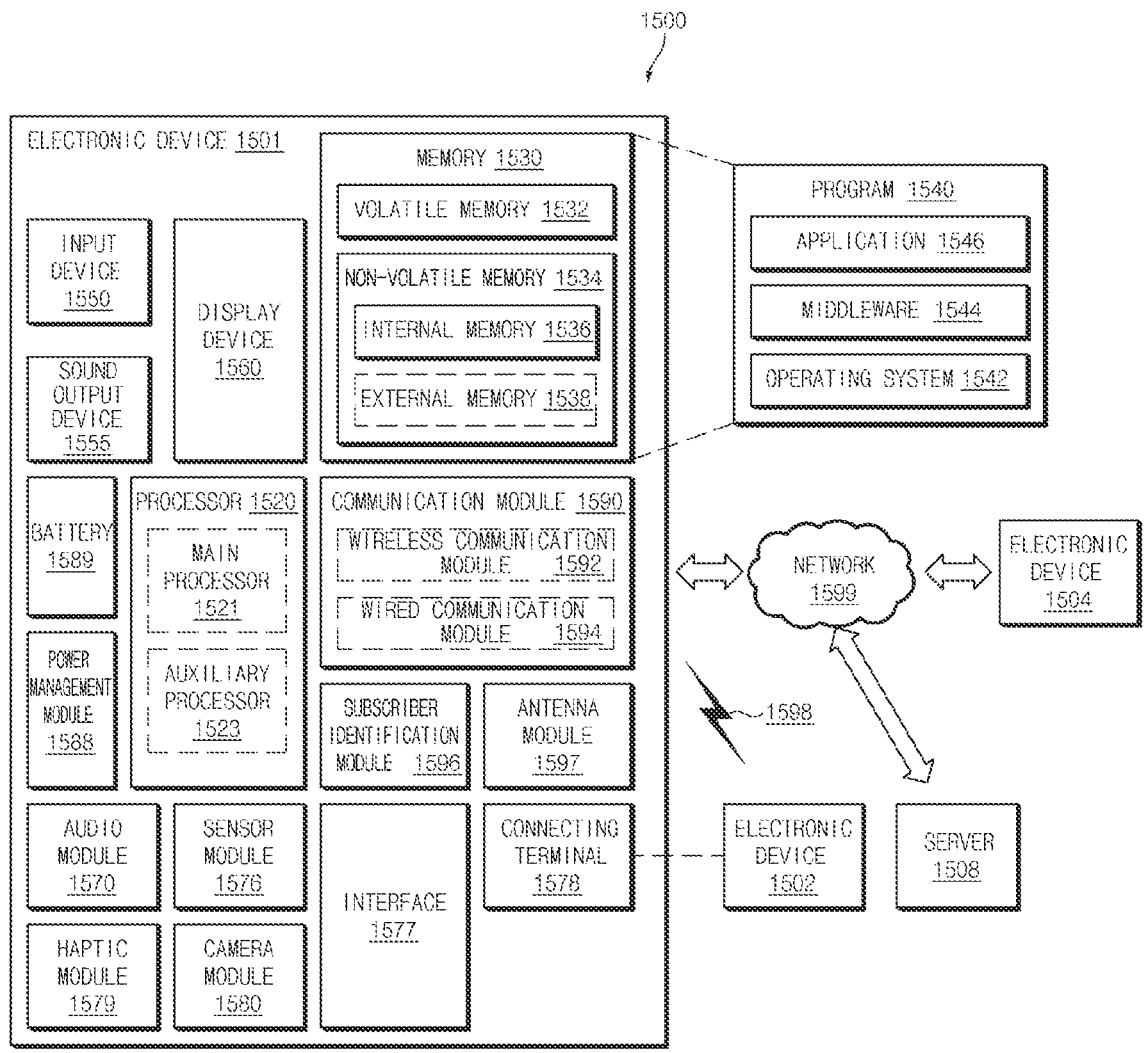
FIG. 15 illustrates a block diagram of an electronic device according to various embodiments in a network environment.

FIG. 15 is a block diagram illustrating an electronic device 1501 in a network environment 1500 according to various embodiments. Referring to FIG. 15, the electronic device 1501 in the network environment 1500 may communicate with an electronic device 1502 via a first network 1598 (e.g., a short-range wireless communication network), or an electronic device 1504 or a server 1508 via a second network 1599 (e.g., a long-range wireless communication network). According to an embodiment, the electronic device 1501 may communicate with the electronic device 1504 via the server 1508. According to an embodiment, the electronic device 1501 may include a processor 1520, memory 1530, an input device 1550, a sound output device 1555, a display device 1560, an audio module 1570, a sensor module 1576, an interface 1577, a haptic module 1579, a camera module 1580, a power management module 1588, a battery 1589, a communication module 1590, a subscriber identification module (SIM) 1596, or an antenna module 1597. In some embodiments, at least one (e.g., the display device 1560 or the camera module 1580) of the components may be omitted from the electronic device 1501, or one or more other components may be added in the electronic device 1501. In some embodiments, some of the components may be implemented as single integrated circuitry. For example, the sensor module 1576 (e.g., a fingerprint sensor, an iris sensor, or an illuminance sensor) may be implemented as embedded in the display device 1560 (e.g., a display).

The processor 1520 may execute, for example, software (e.g., a program 1540) to control at least one other component (e.g., a hardware or software component) of the electronic device 1501 coupled with the processor 1520, and may perform various data processing or computation. According to one embodiment, as at least part of the data processing or computation, the processor 1520 may load a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a central processing unit (CPU) or an application processor (AP)), and an auxiliary processor 1523 (e.g., a graphics processing unit (GPU), an image signal processor (ISP), a sensor hub processor, or a communication processor (CP)) that is operable independently from, or in conjunction with, the main processor 1521. Additionally or alternatively, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control at least some of functions or states related to at least one component (e.g., the display device 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). According to an embodiment, the auxiliary processor 1523 (e.g., an image signal processor or a communication processor) may be implemented as part of another component (e.g., the camera module 1580 or the communication module 1590) functionally related to the auxiliary processor 1523.

The memory 1530 may store various data used by at least one component (e.g., the processor 1520 or the sensor module 1576) of the electronic device 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input device 1550 may receive a command or data to be used by other component (e.g., the processor 1520) of the electronic device 1501, from the outside (e.g., a user) of the electronic device 1501. The input device 1550 may include, for example, a microphone, a mouse, or a keyboard.

The sound output device 1555 may output sound signals to the outside of the electronic device 1501. The sound output device 1555 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1560 may visually provide information to the outside (e.g., a user) of the electronic device 1501. The display device 1560 may include, for example, a display, a hologram device, or a projector and control circuitry to control a corresponding one of the display, hologram device, and projector. According to an embodiment, the display device 1560 may include touch circuitry adapted to detect a touch, or sensor circuitry (e.g., a pressure sensor) adapted to measure the intensity of force incurred by the touch.

The audio module 1570 may convert a sound into an electrical signal and vice versa. According to an embodiment, the audio module 1570 may obtain the sound via the input device 1550, or output the sound via the sound output device 1555 or a headphone of an external electronic device (e.g., an electronic device 1502) directly (e.g., wiredly) or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly (e.g., wiredly) or wirelessly. According to an embodiment, the interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the electronic device 1502). According to an embodiment, the connecting terminal 1578 may include, for example, a HDMI connector, a USB connector, a SD card connector, or an audio connector (e.g., a headphone connector), The haptic module 1579 may convert an electrical signal into a mechanical stimulus (e.g., a vibration or a movement) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic device 1501. According to one embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GLASS) communication module) or a wired communication module 1594 (e.g., a local area network (LAN) communication module or a power line communication (PLC) module). A corresponding one of these communication modules may communicate with the external electronic device via the first network 1598 (e.g., a short-range communication network, such as Bluetooth™, wireless-fidelity (Wi-Fi) direct, or infrared data association (IrDA)) or the second network 1599 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1592 may identify and authenticate the electronic device 1501 in a communication network, such as the first network 1598 or the second network 1599, using subscriber information (e.g., international mobile subscriber identity (IMSI)) stored in the subscriber identification module 1596.

The antenna module 1597 may transmit or receive a signal or power to or from the outside (e.g., the external electronic device) of the electronic device 1501. According to an embodiment, the antenna module 1597 may include one or more antennas, and, therefrom, at least one antenna appropriate for a communication scheme used in the communication network, such as the first network 1598 or the second network 1599, may be selected, for example, by the communication module 1590 (e.g., the wireless communication module 1592). The signal or the power may then be transmitted or received between the communication module 1590 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the electronic devices 1502 and 1504 may be a device of a same type as, or a different type, from the electronic device 1501. According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1540) including one or more instructions that are stored in a storage medium (e.g., internal memory 1536 or external memory 1538) that is readable by a machine (e.g., the electronic device 1501). For example, a processor (e.g., the processor 1520) of the machine (e.g., the electronic device 1501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
    a housing including:
        a first housing structure which includes a first surface, a second surface facing away from the first surface, and a first side surface formed between the first surface and the second surface, and
        a second housing structure which is bendable over the first housing structure with respect to an axis, and includes a third surface, a fourth surface facing away from the third surface, and a second side surface formed between the third surface and the fourth surface,
        wherein the third surface faces the first surface in a folded state of the housing;
    a display viewable through at least a part of the first housing and the second housing;
    a first antenna modules disposed at an upper-left corner of the first housing structure and including a first array of antenna elements disposed to form a first beam in a direction perpendicular to the second surface and a third array of antenna elements including dipole antenna elements disposed to form a third beam in a direction perpendicular to the first side surface;
    a second antenna module disposed at an upper-left corner, which is adjacent to the first housing structure, of the second housing structure and including a second array of antenna elements disposed to form a second beam in a direction perpendicular to the fourth surface and a fourth array of antenna elements including dipole antenna elements disposed to form a fourth beam in a direction perpendicular to the second side surface;
    a third antenna module disposed at a lower-right corner, which is adjacent to the second housing structure, of the first housing and including a fifth array of antenna elements disposed to form a fifth beam in a direction perpendicular to the second surface;
    a fourth antenna module disposed at lower-right corner of the second housing structure and including a sixth array of antenna elements disposed to form a sixth beam in a direction perpendicular to the fourth surface; and
    at least one wireless communication circuit electrically connected to the first array, the second array, the third array, the fourth array, the fifth array, and the sixth array and configured to transmit and/or receive a signal having a frequency between 3 GHz and 100 GHz,
    wherein, in an unfolded state of the housing, the first beam, the second beam, the fifth beam, and the sixth beam are formed in a same direction,
    wherein, in the folded state, the fifth beam and the sixth beam are formed in opposite directions.

2. The electronic device of claim 1, wherein, in the folded state, the first array is aligned in a first direction, and the second array is aligned in a second direction different from the first direction.

3. The electronic device of claim 1, wherein, in the folded state, the third array is aligned in a third direction different from the first direction and the second direction, and the fourth array is aligned in a fourth direction different from the third direction.

4. The electronic device of claim 3, wherein, the third array is aligned in a direction different from a direction in which the first array is aligned, and the fourth array is aligned in a direction different from a direction in which the second array is aligned.

5. The electronic device of claim 1, wherein the first array and the second array include conductive plates arranged in a 1×N array or N×N array where N is equal to or greater than 2.

6. The electronic device of claim 1, wherein the display is a flexible display.

7. The electronic device of claim 1, wherein the display is viewable through at least part of the first surface and the third surface or viewable through at least part of the second surface and the fourth surface.

* * * * *